(12) United States Patent
Suresh et al.

(10) Patent No.: US 8,838,970 B1
(45) Date of Patent: Sep. 16, 2014

(54) IDENTITY VERIFICATION FOR ONLINE EDUCATION

(71) Applicant: Coursera, Inc., Mountain View, CA (US)

(72) Inventors: Bipin Suresh, San Francisco, CA (US); Christopher B. Heather, Mountain View, CA (US); Jiquan Ngiam, Mountain View, CA (US); Minjeong Kim, Cupertino, CA (US); Pamela S. Fox, San Francisco, CA (US); Andrew Yan-Tak Ng, Mountain View, CA (US)

(73) Assignee: Coursera, Inc., Mountain View, CA (US)

( * ) Notice: Subject to any disclaimer, the term of this patent is extended or adjusted under 35 U.S.C. 154(b) by 0 days.

(21) Appl. No.: 14/149,603

(22) Filed: Jan. 7, 2014

Related U.S. Application Data

(60) Provisional application No. 61/750,275, filed on Jan. 8, 2013.

(51) Int. Cl.
*H04L 9/32* (2006.01)
*H04L 29/06* (2006.01)

(52) U.S. Cl.
CPC ..................................... *H04L 63/08* (2013.01)
USPC ........................................................ 713/168

(58) Field of Classification Search
CPC ..... G07C 2209/02; G06F 21/60; G06F 21/78; G06F 21/6227; G06F 2221/2107
USPC ................................................. 726/7; 713/168
See application file for complete search history.

(56) References Cited

U.S. PATENT DOCUMENTS

| | | | | |
|---|---|---|---|---|
| 7,110,576 | B2 * | 9/2006 | Norris et al. | 382/119 |
| 8,386,308 | B2 * | 2/2013 | Kansal et al. | 705/14.19 |
| 8,577,810 | B1 * | 11/2013 | Dalit et al. | 705/67 |
| 2006/0115803 | A1 * | 6/2006 | Kalisiak | 434/323 |
| 2008/0010674 | A1 * | 1/2008 | Lee | 726/7 |
| 2011/0016240 | A1 | 1/2011 | Mills et al. | |
| 2011/0227831 | A1 | 9/2011 | Mills et al. | |
| 2012/0110341 | A1 * | 5/2012 | Beigi | 713/186 |
| 2013/0095463 | A1 * | 4/2013 | Ediger et al. | 434/322 |

* cited by examiner

*Primary Examiner* — Dant Shaifer Harriman

(57) ABSTRACT

Performing identity verification for online education is disclosed. In response to receiving a notification of a submission event, a user is prompted to provide authentication information including at least one of a plurality of types of information. Authentication information received is compared to at least a portion of stored enrollment information associated with the user with which the received authentication information is associated. The stored enrollment information includes at least two different types of information collected during an enrollment phase, including the at least one type of information solicited during the user prompting. In the event that matching criteria are met based at least in part on the comparison, a first action is performed. In the event that matching criteria are not met based at least in part on the comparison, a second action that is different from the first action is performed.

24 Claims, 21 Drawing Sheets

FIG. 10 coursera — ACME UNIVERSITY

INTRODUCTION TO HUMAN PHYSIOLOGY ▾ ANNOUNCEMENTS

COURSES  UNIVERSITIES  ABOUT ▾  JANE SMITH ▾

SIGNATURE TRACK — 1002

READER

INTRODUCTION TO HUMAN PHYSIOLOGY
BY EMMA, JENNIFER

- HOME
- VIDEO LECTURES
- DISCUSSION FORUMS
- QUIZZES
- PHYSIOLOGY ASSIGNMENTS
- PEER ASSESSMENTS
- SURVEYS
- COURSE LOGISTICS
- SYLLABUS
- ABOUT US
- JOIN A MEETUP
- COURSE WIKI
- HELP WITH SUBTITLES

WELCOME!
WELCOME TO THE COURSE! WE ARE EXCITED TO HAVE YOU IN THE CLASS AND LOOK FORWARD TO HELPING YOU BECOME AN EXPERT IN HUMAN PHYSIOLOGY. YOU CAN START WATCHING THE VIDEO LECTURES AND COMPLETING THE REVIEW QUESTIONS.

EVERY WEEK WE WILL RELEASE NEW MATERIAL FOR CLASS, INCLUDING VIDEO LECTURES, REVIEW QUESTIONS AND OTHER EXERCISES. YOU CAN ATTEMPT THE REVIEW QUESTIONS AND OTHER EXERCISES AS MANY TIMES AS YOU LIKE, AND WE WILL ONLY USE YOUR HIGHEST SCORE.

TO HELP KEEP YOU ON TRACK WITH THE COURSE, WE ALSO HAVE DUE DATES ASSOCIATED WITH THE REVIEW QUESTIONS AND OTHER EXERCISES. AFTER THE DUE DATES, WE WILL CONTINUE TO ACCEPT LATE SUBMISSIONS WITH A SMALL PENALTY ON YOUR SCORE.

THE FIRST WEEK'S CONTENT COVERING PHYSIOLOGY BASICS IS AVAILABLE NOW, AND YOU SHOULD WATCH THE VIDEOS AND COMPLETE THE REVIEW QUESTIONS BY MONDAY, MARCH 3.

WE HOPE YOU'LL HAVE A LOT OF FUN LEARNING ABOUT HUMAN PHYSIOLOGY. PLEASE GO TO HTTP://COURSERA.ORG/HP TO GET STARTED!

EMMA, JENNIFER

MON 26 NOV 2012 3:32 PM PST

THE BUSINESS OF OPPORTUNITIES

QUIZZES
TUTORIAL QUIZ
THU 27 DEC 2012 7:14PM PST

IDENTITY VERIFICATION FOR ONLINE EDUCATION

CROSS REFERENCE TO OTHER APPLICATIONS

This application claims priority to U.S. Provisional Patent Application No. 61/750,275 entitled IDENTITY VERIFICATION FOR ONLINE EDUCATION filed Jan. 8, 2013 which is incorporated herein by reference for all purposes. This application also claims priority to U.S. Provisional Patent Application No. 61/788,983 entitled EVENTING ANALYSIS FRAMEWORK filed Mar. 15, 2013 which is also incorporated herein by reference for all purposes.

BACKGROUND OF THE INVENTION

Individuals are increasingly engaging in online education activities. Students taking such courses may do so for various reasons (e.g., professional reasons, lifelong interests in learning, etc.) and invest significant effort into completing assignments, exams, etc. in order to complete a course. However, it can be difficult for the students' accomplishments and efforts in such courses to be recognized.

BRIEF DESCRIPTION OF THE DRAWINGS

Various embodiments of the invention are disclosed in the following detailed description and the accompanying drawings.

FIG. 10 illustrates an example of an interface as rendered in a browser application.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Identity Verification Architecture

Figure 1:
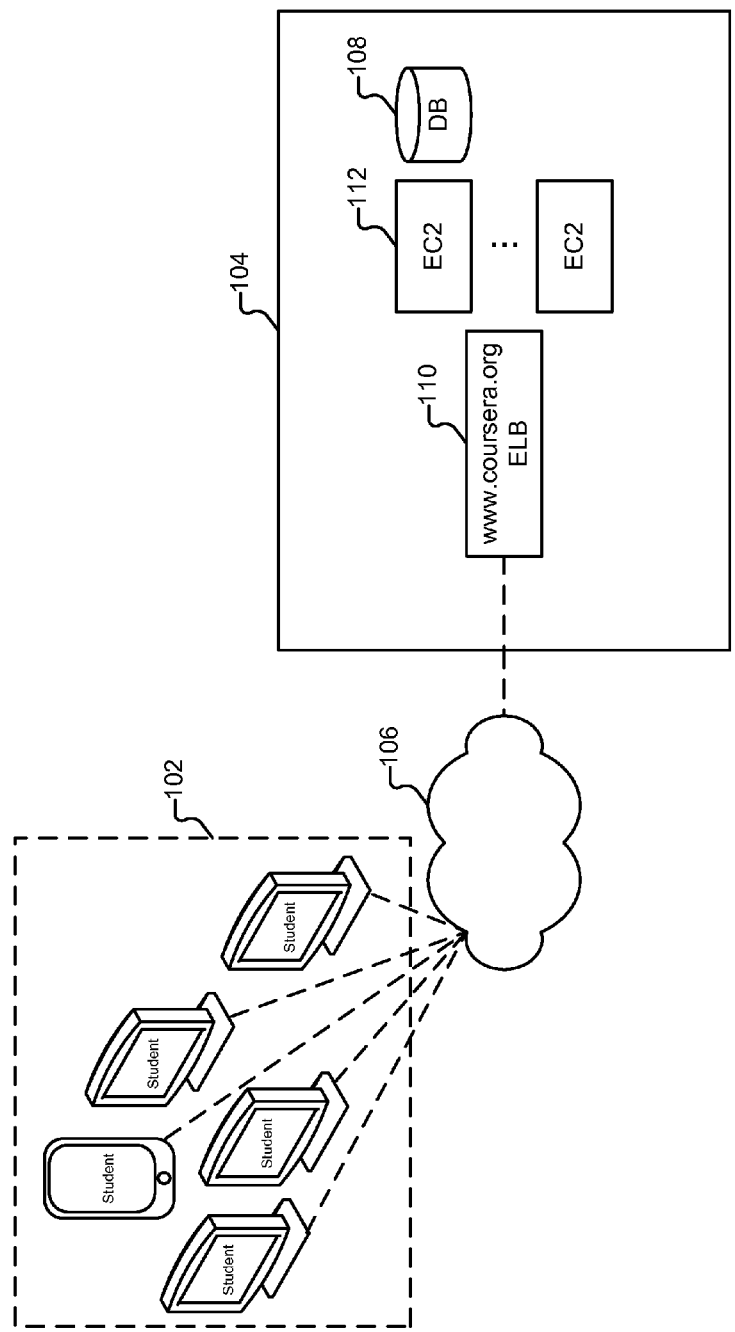
FIG. 1 illustrates an embodiment of an environment in which identity verification for online education is performed.

FIG. 1 illustrates an embodiment of an environment in which identity verification for online education is performed. In the example shown, online education platform 104 supports massive open online courses ("MOOCs"), in which tens of thousands (or other applicable numbers) of students (learners) can enroll, and participate, in the same course at the same time.

In this example, a MOOC may be offered on an identity-verified track (also described herein as a "signature" track) as well as a non-identity-verified track (e.g., a "basic" or "regular" track of the course that may be offered to students for free). While both tracks may run in parallel, with students in either track completing the same coursework on the same deadlines, the identity-verified track adds an additional layer of authenticity to a student's work by securely linking the student's coursework to the student's real identity. As will be described in more detail below, joining in an identity-verified track of a selected course includes an enrollment/registration phase in which various information is collected from a student and used to verify the student's real identity as well as create a verified profile of the student. The collected enrollment/registration information and created profile are then stored, such that throughout the course (e.g., when the student submits an assignment), the student is challenged to provide authentication information that is compared against the stored enrollment/registration information in order to verify their identity and authenticate the student's coursework.

By being able to verify the identity of a student completing the course and accurately attribute the student's coursework to the student's real identity, verified credentials such as verified certificates and certifiable course records can be offered/awarded to the student of the MOOC. The student can then list his/her accomplishments on a resume or CV, direct other entities, such as companies, friends, family, etc. to the verified credentials, etc.

Additionally, because the identity of the student can be verified, financial aid can also be awarded. For example, a financial aid program can be provided that is designed to provide students in all economic circumstances the opportunity to earn verified certificates by participating in a course's identity-verified track. For example, the financial aid program may be designed for students who face significant economic hardship so that these individuals with genuine need may be provided the opportunity to join a course's identity-verified track at no cost to them.

In some embodiments, in order to be eligible for financial aid, the student submits an application and is required to prove that the student meets a set of criteria. This can include demonstrating significant economic need relative to the cost of joining a course's identity-verified track, demonstrating that the verified certificate is of significant value to the student's/learner's education or career, demonstrating values consistent with those of the learning community, completion of the course (if the student is approved but does not complete the course, the student may be ineligible to apply again), etc. The financial aid can be provided on a course-by-course basis, with links to applications for that course displayed on the homepage for the identity-verified track of the course.

Returning to FIG. 1, students, using client devices 102, connect to platform 104 via one or more network(s) 106 represented in FIG. 1 as a single network cloud. The students can sign up for an account with the platform, which is, for example, linked to the student's email address. Students interact with platform 104 to enroll in courses and receive instructions, such as through video lectures and handouts. As part of taking a course, students also submit work, such as surveys, quizzes, exams, homework, exams, assignments, etc. Examples of client devices 102 include desktop computers, portable computers, tablets, smartphones, and any other appropriate electronic devices configurable to communicate with platform 104 in accordance with the techniques described herein.

In some embodiments, instructors can use client devices to connect to platform 104 to provide course materials to platform 104. Other entities, such as reviewers associated with the platform, can also connect to the platform via client devices, for example, to manually review information used in verifying the identity of students (e.g., reviewing photo IDs against provided headshots, comparing information listed on photo ID documentation against collected personal information, etc.).

In the embodiment shown in FIG. 1, when client devices (e.g., any of devices 102) attempt to access course resources provided by platform 104, they initially communicate with an Amazon Elastic Loadbalancer (ELB) 110. The ELB distributes traffic across multiple Amazon EC2 instances (e.g., instance 112) which serve content to the client devices (e.g., via web frontends, native applications installed on mobile devices, etc.). In some embodiments, databases such as database 108 are used to store information such as account information, personal information, profile information, collected enrollment/registration and authentication information (e.g., keystroke biometrics, webcam headshots, webcam capture of photo ID documentation), credentials (e.g., statements, verified certificates, certifiable course records, etc.), or any other appropriate information. The storage of the data can also be divided across multiple storage locations (e.g., using Amazon S3). In some embodiments each course is associated with its own database, which is used to store course content (e.g., submitted by instructors via an interface provided by instance 112), student information, student submissions, authentication information submitted with the student submissions (which may be used to authenticate the submissions), etc. In some embodiments, multiple databases are used, as applicable. For example, when storing enrollment/registration information collected during an identity-verified track enrollment/registration phase, separate databases can be used for storing different types of enrollment/registration information such as keystroke profiles, headshot photos, photo ID documentation captures, etc. In some embodiments, platform 104 is also configured to host information, such as course records.

Platform 104 as shown in FIG. 1 is implemented using a scalable, elastic architecture. When platform 104 is referred to as performing a task, such as storing data or processing data, it is to be understood that a sub-component or multiple sub-components of platform 104 (whether individually or in cooperation with third party components) may cooperate to perform that task. Further, certain tasks may be distributed such that a given task is accomplished by multiple instances of a component depicted in FIG. 1 as a single component. In some embodiments, online education platform 104 comprises a single device, such as a standard commercially available server (e.g., with a plurality of multi-core processors, 16+Gigabytes of RAM, and one or more Gigabit network interface adapters) and runs a typical server-class operating system (e.g., Linux).

Support for identity verification by platform 104 allows students to have their identities verified when enrolling in a course and also allows for their identities to be verified throughout the duration of the course (e.g., when submitting coursework) to verifiably demonstrate that they have fully participated in the course. Identity verification also allows the students to securely link their coursework to the real identity, adding an additional layer of authenticity to their accomplishments in completing a MOOC. By offering identity-verified tracks for courses, students can also receive verified credentials such as certificates that are accurately attributed to their real identity.

Example Workflow and Platform Architecture

In some embodiments, identity verification is performed in accordance with a workflow that includes the following two phases:

1. Enrollment/Registration Phase: In this phase, a student enrolls in a course which offers an identity-verified track. If it is the first time that a student has enrolled in an identity-verified track for a course, as part of the enrollment process, the student registers with the MOOC platform and creates an identity-verified profile for his/her account (e.g., via a web front-end enrollment/registration interface provided by platform 104, a native application installed on a mobile device, or any other appropriate front-end interface). The information collected during this phase is used to verify the identity of the user enrolling in the course. In various embodiments, creating an identity-verified profile includes prompting the student to type a phrase in order to create a profile of the student's unique typing pattern, prompting the student to provide a headshot via a webcam, prompting the student to provide a webcam photo of an ID document associated with the student, prompting the student to enter personal information about themselves, and/or other prompting for other appropriate identity information. In some embodiments, the enrollment/registration phase includes confirming the student's identity using the various collected pieces of information 2. Authentication Phase: In this phase, the student authenticates his/her identity with each piece of coursework (e.g., quizzes, exams, homework, assignments, etc.) that the student submits. The student can authenticate his/her identity to sign his/her work by typing an authentication phrase and matching keystroke biometrics against a phrase such as the phrase typed during the enrollment/registration phase or by taking a webcam photo of the student's face, which can be verified against the webcam photo taken during the enrollment/registration phase.

Details regarding embodiments of the above phases will now be described.

1. Enrollment/Registration Phase:

During the enrollment phase for an identity-verified track of a course, a student is prompted to register (if they have not already done so) with a MOOC platform to create an identity-verified profile that is linked with the student's account. The profile will include information collected from the student that will be used to verify the identity of the student enrolling in the course, as well as be used to authenticate the identity of the user throughout the duration of the course (e.g., when submitting coursework). Examples of interfaces (e.g., web front-end interfaces provided by platform 104) used to collect information in order to create the profile are shown below in conjunction with FIGS. 3-9.

In some embodiments, the identity-verified track runs in parallel with the basic/non-certified track for the course, and the student will complete the same coursework on the same deadlines as all other students on the non-identity-verified track the course.

In some embodiments, the student is permitted to join the identity-verified track within a specific join period, which can represent a time window (e.g., two weeks from the start of the course) in which the student can enroll in the identity-verified track (e.g., upgrading from a basic course track). After the join period is over, the identity-verified track will no longer be available for the course. Notifications can be provided to students warning them that the identity-verified track join period for the course is about to close. For example, on a homepage of the course, banners, a countdown, etc. can be displayed indicating the remaining number of days left to join the identity-verified track. In some cases, a student is allowed to join the identity-verified track for the course after submitting coursework during the join period (e.g., student is reminded about deadline to join identity-verified track when submitting an assignment).

In some embodiments, enrollment in the identity-verified track is specific to a particular course, and enrollment in the identity-verified track for one course does not carry over to other courses (i.e., the user is enrolled in the identity-verified track of only the course that they are signing up for, and must sign up separately for the identity-verified tracks of other courses).

A. Creating an Identity-Verified Profile Sub-Phase

During the enrollment process, an identity-verified user profile is created for the user. During this phase, the student is prompted to provide a set of information in order to generate an identity-verified profile. Personal information/data provided to platform 104 is securely encrypted during transmission.

In some embodiments, the profile is included as part of the student's account, and is stored as long as the student has the account, such that the profile only needs to be created once. For example, if the student has previously created an identity-verified profile (e.g., having previously joined the identity-verified track for another course), then the student is not required to go through the profile creation process again (i.e., the student has previously registered with the MOOC platform and created an identity-verified profile), and can instead be directed, for example, to a payment screen to pay for joining the identity-track of the course of interest. For example, suppose the student has previously enrolled in the identity-verified track of Calculus 101, and has gone through the registration process and provided information to create an identity-verified profile. If, later on, the student would like to sign up for the identity-verified track of Art 101, because the student already successfully completed the identity-verified track registration process, the student is not required to reenter the information and can instead be directed to the payment screen to pay to be enrolled in the identity-verified track for Art 101 (i.e., the same registered/identity-verified profile for the student can be used for multiple identity-verified track enrollments). In some embodiments, registration and creation of an identity-verified profile for a student is performed independently of enrolling in a course.

In some embodiments, registration and creation of the identity-verified profile is be associated with a series of requirements for the student, such as access to a computer with a working webcam, a computer running a supported browser, possession of an acceptable photo ID document, etc. If the requirements are met, the student is able to create an identity-verified track profile using the following the steps described below.

The various verified profile creation sub-phases described below can be performed in any appropriate order.

1. Creating an Identity-Verified Phrase Sub-Phase

In this sub-phase, the student's unique typing behavior and personal typing pattern (which is unique for individuals, for example, on a millisecond scale) is captured/recorded and linked to the student's identity. The student can be prompted to type a short sentence provided by platform 104 (e.g., an honor code statement), allowing for a typing profile of the student's unique typing pattern to be captured (i.e., capturing keystroke biometrics for the student). For example, the student can be prompted to type the text of a provided phrase into a special field, in which platform 104 will learn to recognize the unique typing pattern of the student. In some embodiments, multiple typing samples (e.g., multiple entries of the same phrase) are requested from the student in order to improve recognition of the typing pattern. For example, the student may be required to type the provided phrase at least two times in order to create an accurate initial typing profile of the student's typing pattern. In some cases, if the student's submission is significantly different from the prompt, the student may be asked to try typing in the phrase again. A recommendation may also be made to the student that the student should use the same style of keyboard to create the profile that the student plans to use throughout the course (i.e., for consistency). For example, if the student uses a regular keyboard during enrollment, but a tablet during coursework submission, the typing pattern captured between the two phases may not match, and a recommendation can be made to the student to always use the computer keyboard when submitting coursework.

In some embodiments, the phrase that the student is prompted to type is provided by the MOOC platform operator (e.g., by platform 104). In other embodiments, the student is allowed to select their own phrase to type. In some embodiments, this phrase is a hybrid phrase, where a first portion of the text of the phrase is provided by the MOOC platform operator, but a second portion of the text of the phrase is provided by the user. For example, the user can be prompted by the platform to type in the phrase "My favorite animal is," with the user free to enter their own favorite animal to complete the phrase.

In some embodiments, while typing in the phrase, the user is presented with a progress bar or another appropriate indicator (e.g., completion percentage) indicating the user's progress in completing the typing sample.

The captured typing samples can then be evaluated/analyzed to create a typing profile for the student, which can then be stored, for example, to database 108 of platform 104. In some embodiments, the typing profile for the student is generated using off-the-shelf third-party keystroke biometric software. Custom keystroke biometric software can also be used.

An example of an interface for capturing typing samples and creating a typing profile for the student is described below in conjunction with FIG. 5.

As will be described in more detail below, the student can then be prompted during authentication of submission events (e.g., submission of coursework assignments) to type the same enrollment phrase (or a phrase different from the enrollment phase), and the captured typing samples are compared to verify the identity of the student.

2. Webcam Capture Sub-Phase

In this sub-phase of the identity-verified profile creation process, the student is prompted to take a picture of the student's face using a webcam (or any other appropriate imaging device) and a picture of an acceptable photo ID document. The captured photos can be used to ensure that a credential (e.g., certificate to be provided to the student upon completion of the course) is accurately attributed to the student.

As part of the webcam process, the student is requested to grant an enrollment page (e.g., web front-end page provided by platform 104) access to the student's webcam. For example, a prompt can be displayed in the student's browser window regarding webcam access, with an option to allow access to the webcam for the student to select.

a. Headshot/Self-Portrait Capture

During the headshot capture process, the student can be presented guidelines for taking the photo, such as guidelines for aligning his/her head, ensuring that the student is in a well-lit environment, etc. When ready, the student can then take photos. Options for retaking photos can also be provided. Once satisfied, the student can submit the headshot photo. An example of an interface used to capture webcam photos of the student's headshot is described below in conjunction with FIG. 6.

The headshot photo is then stored by platform 104, for example, in database 108 of FIG. 1. The headshot photo may be stored privately, and not made publicly visible, for example, on the student's public profile on online education platform 104. In some embodiments, the headshot photo is used as the student's private identity-verified profile photo.

b. Capturing Photo ID Documentation

During this phase, a webcam photo of a student's photo ID document is captured. An example of an interface used to capture a webcam photo of a student's photo ID document is described below in conjunction with FIG. 7.

A variety of requirements for the ID documents can be enforced, as applicable. For example, types of acceptable photo identification documents can include government or state issued driver's licenses, passports, nation ID cards, state or provincial ID cards (including cards issued by motor vehicle agencies), military ID cards, etc. Further requirements for the ID document can include that the document bear the exact full name of the student (but excluding hyphens, accents, and spaces) as entered by the student when creating the student's identity-verified profile (e.g., as part of entering personal information during a personal information collection phase described below), bear a photograph of the student, be an original document, be valid, etc. Unacceptable ID documents can include any document that does not bear the student's name exactly as it is entered in the student's identity-verified profile, any document that is photocopied, any document that has expired, credit/debit cards, birth certificates, social security cards, employee ID cards, international driver's licenses, draft classification cards, international student IDs, diplomatic, consulate, or embassy ID cards, notary-prepared letters or documents, temporary IDs, etc.

As with the headshot phase, the student can be presented with guidelines for taking the photo, such as guidelines for aligning the photo ID, holding the document at a distance that allows the details of the document to be legible, holding the document at a distance that maintains the focus of the image, etc. In some embodiments, the student is presented a preview of the ID document capture prior to submission, with which the student can, for example, confirm the legibility of the ID document.

The webcam capture of the photo ID documentation can then be stored by platform 104, for example, in database 108 of FIG. 1. As will be described in more detail below, the photo ID documentation information can be used to verify the name and headshot photo of the student. As will also be described in more detail below, as part of a data security policy, the photo ID documentation may be deleted upon successful verification of the enrolling student's identity (or after a predefined period of time).

In some embodiments, the photo id documentation webcam capture is stored in a server that is in a secure location that is isolated from other data servers.

3. Entering Personal Information Sub-Phase

In this sub-phase of creating an identity-verified profile, the enrolling/registering student is prompted to provide his/her name and other personal information. An example of an interface used to collect the student's personal information is described below in conjunction with FIG. 8.

In various embodiments, the captured/collected personal information includes the full legal first (given) and last (family) names of the student (where the student is prompted to enter the name exactly as it matches on the photo ID document that they submit, excluding hyphens, accents, and spaces), the student's date of birth, the student's current address, etc.

The captured personal information can then be stored by platform 104, for example, in database 108 of FIG. 1. For privacy protection purposes, the information may be held privately, and is not displayed in the student's public profile.

Upon completion of the capture of the typing pattern, webcam photos, and personal information described above, the student is prompted to enter payment information (e.g., credit card number, etc.) to pay for enrolling in the identity-verified track of a course. As the identity-verified track is offered on a course by course basis, the pricing for enrolling in the identity-verified track of a course may vary from course to course. An example of an interface for payment information is described below in conjunction with FIG. 9

In some embodiments, payment information (e.g., credit card information) that is collected is passed to a third-party payment platform that handles payment transactions. Platform 104 then receives a signal from the payment platform indicating whether the payment succeeded or failed. Based on the signal, the user's profile can be updated to reflect that the user has successfully paid to join the identity-verified track of their selected course, and is officially enrolled. As described above, in some embodiments, the payment is requested on a per course basis (i.e., the student pays each time that they would to like to enroll in the identity-verified track of a course).

B. Verification of Identity of Prospective Student Using Collected Enrollment/Registration Information During this phase, which can be performed after the student has provided the personal information described above, information such as the typing profile, headshot photo, webcam capture of photo ID document, and personal information can be used to verify the identity of the student.

For example, using the captured information, the identity of the enrolling student can be confirmed by matching the photo on the ID document with the captured headshot photo. In one example, information collected during the enrollment process can be retrieved from storage such as database 108 of FIG. 1 and presented to a reviewer (e.g., an employee associated with the online education platform) who can manually review the ID document and headshot. Additionally, the personal information provided by the user (e.g., legal name, date of birth, address, etc.) can be compared against information listed in the provided photo ID documentation to confirm the identity of the student. The manual reviewer can then decide whether to accept or reject the potential student for inclusion in the identity-verification track.

In some embodiments, the reviewer (e.g., employee of operator of platform 104) also verifies that information on the photo ID documentation (e.g., photo, country, name, etc.) is legible and/or meets the requirements/criteria for acceptable photo ID documentation as described above. Verification of the user's identity can also include determining whether the photo ID documentation is fake. In some embodiments, comparison of collected personal information with information extracted from photo ID documentation is performed automatically via software instead of or in addition to a manual review process.

In some embodiments, once enrollment/registration information captured during the enrollment/registration process is confirmed (i.e., identity of enrolling student is confirmed), the ID document photos are deleted, for example, from database 108 of platform 104.

In some embodiments, regardless of whether the student is verified or not, the photo ID documentation information is deleted for security purposes (e.g., to prevent photo ID documentation from being compromised in case of a malicious attack on the platform). The deletion can be automatically performed after a predetermined time period as well.

Upon verification of the student's identity and successful completion of the student's identity-verified profile (i.e., a registered/identity-verified profile for the student has been created), the student is sent a confirmation email and is enrolled in the identity-verified track of the selected course.

In some embodiments, if the potential student is rejected, the student is notified that his/her enrollment has not been accepted.

Using the information captured above, an identity-verified profile for the student is created and associated with the student's account (e.g., created when signing up with platform 104 and linked to the student's email address). Upon verification of the student's information and the student's identity, as well as successful creation/completion of the student's identity-verified profile using the captured information described above, the student is provided a notification (e.g., confirmation email) from the operator of platform 104. The student can now take the identity-verified track for the course of interest, for example, to work towards a verified credential (e.g., verified certificate) upon completion of the course. Additionally, as the student has a registered/identity-verified profile with the system, when enrolling in the identity-verified track for additional courses, the same profile can be used and the student is not required to undergo the registration/profile creation process again.

2. Authentication Phase—Confirming Coursework

While taking a course, the student completes and submits various course assignments, such as quizzes, exams, homework, or any other appropriate assignments. As part of the identity-verified track for the course, in some embodiments, the student is also prompted to authenticate the student's identity with each submission event (e.g., submission of homework, quiz, etc.). This allows the student to link the student's work to the student's real identity. As the student's identity can be verified throughout the duration of the course, verified credentials, such as verified certificates and certifiable course records can be provided that verifiably demonstrate/recognize that the student has fully participated in the course.

Examples of interfaces used for collecting authentication information are shown below in conjunction with FIGS. 13-16.

A. Authentication Information Collection

As will be described in more detail below, the identity of the student submitting the coursework is authenticated/verified using information collected during the enrollment/registration phase and that is included in the identity-verified profile of the student that the user submitting the coursework purports/claims to be. This can include utilizing the typing profile created during the enrollment/registration phase as well as the webcam headshot photo captured during the enrollment/registration phase. By verifying the identity of the student submitting the coursework, the submitted coursework can be effectively signed by the student and accurately attributed to the student.

Whether identity-authentication is required can be made dependent on the type of event. For example, while authentication of the student's identity may be required when submitting assessments such as quizzes, homework, assignments, etc., for other types of coursework, such as watching video courses, completing in-video quizzes, participating in course forums, etc., authentication may not be required.

Examples of interfaces used to capture authentication information used to verify the identity of a user are shown below in conjunction with FIGS. 10-15.

B. Keystroke Verification/Authentication

In some embodiments, the identity of the student submitting coursework is authenticated by capturing a typing sample for the submitting student, which will be compared to/evaluated against the purported student's typing profile created during the enrollment/registration phase. Examples of interfaces for capturing a typing sample of a user during a submission event are described below in conjunction with FIGS. 13-15.

In some embodiments, the phrase that the user is prompted to type is the same as the phrase that the user typed during the enrollment phase. In some embodiments, the authentication phrase that the student is prompted to enter when submitting coursework is at least partially different from the phrase provided during enrollment. For example, while the text of an enrollment phrase might describe the honor code, the text of the authentication phrase might be a phrase that is customized to include the user's name, the assignment that the user is submitting, etc. The phrase can be selected by the MOOC platform operator, the user, and can also be a hybrid phrase where part of the phrase is provided by the MOOC platform, and another part provided by the user (e.g., user completes a phrase started by the platform provider).

In some embodiments, the user is provided with an indication of his/her progress in entering the phrase, as well as an indication of the matching level of the phrase. The matching level can indicate a measure (e.g., percentage) of the match between the characters typed by the user and the characters of the phrase (e.g., 30% of displayed characters have been entered correctly). In some embodiments, a color bar indication is presented. The indicator can also provide an indication of a level/progress of authentication (e.g., user is 30% authenticated). In some embodiments, the indicator can also provide an indication of a keystroke authentication match. The indicator can also include an indication of the level of recognition of the user's identity given the portion of the phrase that the user has typed so far.

Upon submitting coursework with the entered authentication phrase, platform 104 is configured to compare (e.g., using keystroke matching software) the authentication typing sample with the original typing profile generated for the student during enrollment time along multiple dimensions.

If the authentication-time typing profile (e.g., typing pattern determined from authentication-time typing sample) meets similarity criteria with the enrollment-time typing profile, then the student has successfully signed their coursework (i.e., authenticated their identity). A notification may also be displayed to the student indicating that they have successfully submitted and signed their coursework.

As needed, the entry of an authentication typing sample can be troubleshoot. For example, if the user's attempts at entering a matching typing sample are unsuccessful (e.g., matching/similarity criteria are not met), the user can be presented with information related to situations that may affect his/her ability to provide a matching typing sample. Example situations which may affect the ability of the student to provide a matching typing sample include using a significantly different style keyboard than the one used to create the enrollment typing profile, hand injuries, purposefully altering ones typing behavior, using a mobile device such as a tablet or smartphone, etc. In some embodiments, if the user is unable to provide a matching typing sample (e.g., within three attempts), the user may be contacted afterwards (e.g., by an employee of the MOOC platform operator) to make sure that the process of identity verification via the user's typing samples is working properly.

In some embodiments, if the presented phrase is typed incorrectly by the user (e.g., words misspelled, missing, etc.) the user can be notified that their typed phrase cannot be submitted.

C. Authenticating Via Webcam Headshot Photo

In some embodiments, if the first authentication-time typing sample attempt does not meet matching criteria, the student is allowed to try again (e.g., up to three times). If the student is unable to provide a matching typing sample within the allotted number of retry attempts, the student is prompted to take a webcam photo of their face, which will be checked against the initial enrollment photo (e.g., via a manual review process).

In some embodiments, instead of using the typing sample to verify his/her identity, the student can opt to be verified via using a webcam photo.

In some embodiments, the student is requested to submit both a typing sample and a webcam photo when submitting coursework (i.e., each submission event is associated with a corresponding typing sample and webcam photo). For example, suppose a course includes five quizzes. Each quiz is associated with a corresponding set of keystrokes biometrics and a webcam photo. During the identity verification process, a reviewer individually authenticates each quiz (e.g., determining that quizzes 1, 3, 5 were successfully authenticated, but that authentication of quizzes 2 and 4 failed). In some embodiments, the keystrokes are authenticated automatically using either custom or third-party software.

In some embodiments, coursework is authenticated at the time of submission. In other embodiments, authentication information is collected and stored (e.g., in database 108 of platform 104 of FIG. 1) at the time of a submission event, but is not used to verify the identity of the user and authenticate the coursework until a later time. For example, the coursework submission can be authenticated at the end of the course. One reason to wait until the end of the course is for efficiency purposes: there may be numerous submission events throughout the duration of the course, and waiting to perform authentication of the submission event until the end of the course can allow a manual reviewer to conduct a batch verification of all of the student's submissions at once more efficiently than if the verifications were done throughout the course.

Verified Credentials

Upon completion of the course in the identity-verified track, the student can be issued verified credentials, such as verified certificates and certifiable course records that are accurately attributed to the student's verified identity. The student can be determined to have completed the course according to criteria such as an instructor's grading policy which may define how a student's final score in the course is calculated. The student can also be subject to honor code and academic integrity policies as well. For example, if a student is found to have violated course policies or the honor code, the student can be removed from the identity-verified track of the course without entitlement to a refund.

In some embodiments, in addition to passing the course according to the instructor's grading policy, the student must also pass authentication/identity-verification criteria in order to successfully complete the identity-verified track of the course and be issued verified credentials. For example, in some embodiments, issuance criteria include requirements regarding the number of assignments that must have been authenticated. For example, a policy may be in place that requires that a threshold number, percentage, etc. of submission events (e.g., coursework assignments) in the course must have been successfully authenticated in order for the user to qualify for the verified certificate, otherwise the user is ineligible to receive the verified certificate.

For example, while taking the course, an assessment page can be provided that includes an indication of the assignments that have been authenticated (e.g., via checkmarks next to the submitted assignments), as well as an indication (e.g., warning) of whether or not the user has been authenticated a sufficient number of times.

1. Verified Certificate

Upon completion of the course, a verified certificate can be awarded to the student. The verified certificate indicates that the student, whose identity has been verified, has completed the course according to the requirements of the course, tying the student's coursework to their real identity.

In some embodiments, the verified certificate lists both the university which taught the course as well as the operator of platform 104 as co-issuers. With the verified certificate, the student is able to electronically share his/her course performance, in a verified format, via a certifiable course records page, with any other entity.

The verified certificate can include various features, such as the university (conveying that the completed course is authorized by the university), the name (e.g., legal name) and identity of the student, and an endorsement by the instructor (e.g., signed by the instructor). The verified certificate can also include a verification uniform resource locator (URL) guaranteeing the authenticity of the student's certificate. If the student wishes to share a certificate with other entities (e.g., an employer), confirmation of the student's accomplishment and completion of the course can be confirmed via the verification URL. The verified certificate can also include a detailed course description page.

In some embodiments, students are provided by platform 104 with an opportunity to share their accomplishments via various networks (e.g., social networks, professional networks, employment/job networks, etc.) such as Twitter®, Facebook®, Google+®, LinkedIn®, etc.

In some embodiments, a verification code (e.g., unique string of numbers and letters) is provided on the verified certificate that when entered at the verification URL, identifies the user's verified certificate. For example, an employer who wishes to review the user's verified certificate can enter the verification code at a site associated with the verification URL, and is presented information that indicates that the user's verified certificate was issued on a particular date to the user (indicated by the user's name), allowing the employer to verify that the user earned the verified certificate.

Examples of verified credentials are discussed below in conjunction with FIGS. 18 and 19.

2. Certifiable Course Records

In some embodiments, in addition to the verified certificate, certifiable course records are also provided/issued to the student. With the certifiable course records, anyone designated by the student can be allowed to certify the student's accomplishments directly with the operator of platform 104. For example, via the course records page, the user's verified certificates can be downloaded for courses for which the user has completed the identity-verified track An example of a course records page is discussed below in conjunction with FIG. 16.

Figure 2:
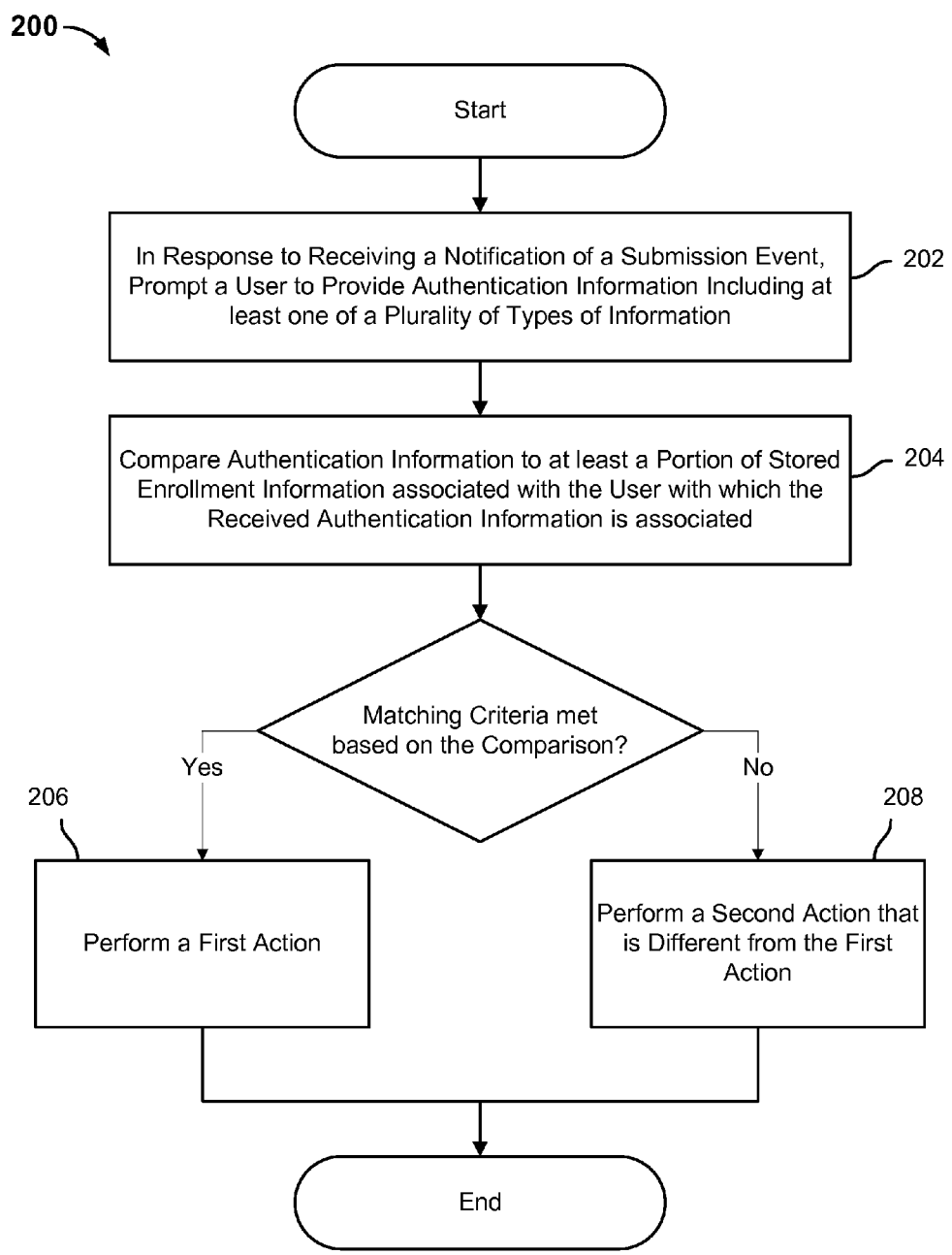
FIG. 2 is a flow diagram illustrating an embodiment of a process for identity verification for online education.

FIG. 2 is a flow diagram illustrating an embodiment of a process for identity verification for online education. In various embodiments, process 200 is performed by platform 104. The process begins at 202 when, in response to receiving a notification of a submission event (e.g., submission of an assessment such as a quiz, exam, homework, or any other appropriate coursework assignment), a user is prompted to provide authentication information. The authentication information can include various types of information, such as a typing sample, a headshot of the user taken with a webcam, or any other appropriate type of authentication information. Various examples of authentication information collection are described above.

At 204, the received authentication information is compared to stored enrollment/registration information associated with the user. In some embodiments, the stored enrollment information includes at least two different types of information collected during an enrollment phase, one of which matches the type of information solicited during the user prompting. The different types of information captured during enrollment can include a typing sample (which was evaluated to determine a unique typing profile for the user), a headshot/portrait of the user taken with a webcam, a photo of a user's photo ID documentation taken with a webcam, personal information about the user, or any other appropriate type of enrollment information. In various embodiments, the collected personal information includes the user's legal first and last name, address, etc. Various examples of comparing authentication information against enrollment information are described above.

In some embodiments, as described above, during the enrollment/registration phase, the typing sample collected from the user is analyzed/evaluated to generate a unique typing profile for the user. For example, the typing profile can include a vector of keystroke biometrics, which can include the distance of time between characters typed (e.g., measure of time between key presses) as well as the combined depression/release of each key typed by the user. The captured keystroke biometrics can be stored in one or more vectors.

In some embodiments, as described above, the phrase typed by the user during the authentication phase is the same as the phrase entered at enrollment time, but need not be. For example, while the user can be prompted to enter the honor code during enrollment, during authentication of a coursework assignment, the user may be prompted to enter a phrase that is customized to include their name as well as the title of the assignment that they are entering. In various embodiments, the phrases that the user is requested to enter are provided by the MOOC operator, generated by the user (i.e., user is allowed to enter whatever phrase they wish), or is a hybrid phrase (e.g., the MOOC operator provides the beginning of the phrase, but the user is requested to complete the phrase with whatever text they wish).

In some embodiments, the comparison is performed to determine whether there is a sufficient match between the authentication information and stored enrollment information. If a match has been found, then the user's identity for the submitted coursework is verified. In some embodiments, a match is determined to have been found if match criteria are met. For example, as described above, the typing sample collected at enrollment time can be used to create a profile of the user's unique typing pattern, which is linked to their identity. When submitting coursework, the user can be prompted to enter a typing sample (either the same phrase or a different phrase from the text the user was prompted to type during enrollment), which is analyzed and compared against the enrollment-time typing profile. If the two typing samples match, then the user's identity is verified, and the submitted coursework is linked to the student.

At 206, in the event that a match is determined, a first action is taken. For example, if the typing sample entered by the user at submission time matches the stored enrollment/registration typing sample, then the user's identity is verified, and the submitted coursework is linked to the user's verified identity. In some embodiments, a marker is associated with the submitted coursework indicating that the identity of the user that submitted the assignment has been verified. In some embodiments, the number of identity-verified assessments is kept track of and used to determine whether a user should be issued a verified credential.

At 208, in the event that a match is not determined, a second action (that may be different from the first action) is taken. For example, if the user was prompted to enter a typing sample at the time of submission of an assignment, and the typing sample did not match the enrollment/registration typing sample/profile of the entity which the user submitting the coursework purports to be, the user can be prompted to take a webcam headshot photo. The identity of the user can then be verified by comparing (e.g., via a manual review) the submission-time headshot photo with the enrollment-time headshot photo of the entity who the user claims to be. In some embodiments, the user is allowed to attempt authentication via the typing sample several times before being prompted to take a webcam photo. In some embodiments, the user is requested to provide both the typing sample and a webcam photo at the time of submission.

In some embodiments, keystroke authentication is performed at the time of a submission event, and if unsuccessful, the user is prompted to provide a webcam headshot photo.

In some embodiments both a typing sample and a webcam headshot are collected from the student at the time of submission, but the authentication information is stored and not verified until the end of the course, such that, for example, all submitted assignments can be verified as part of a batch process to improve efficiency.

Based on the verification of the user's identity for various submission events throughout the duration of the course, the coursework submitted by the user can be accurately attributed to their real identity. Upon completion of the identity-verified track of the course (where successful completion may be determined according to/subject to criteria such as a grading policy, identity-verification policy requirements, honor code, etc.), as described above, the user can be issued verified credentials (e.g., verified certificates, certifiable course records, etc.) that can be shared by the user with others (e.g., via social networks, sharing of URL to certifiable course records hosted on platform 104, listing on resume/CV, etc.)

Interface and Credential Examples

The following interface examples follow a student, Jane, as she enrolls in the identity-verified track of a MOOC titled "Introductory Human Physiology" taught by "Acme University." In some embodiments, the example interfaces and credentials shown below are supported by platform 104 and exemplify interfaces for the example architecture and workflow processes described above. For purposes of illustration, examples of interfaces as rendered in a browser application are described below. In some embodiments, other front-end interfaces, such as mobile (e.g., smartphone, tablet, etc.) native applications can also be used.

Figure 3:
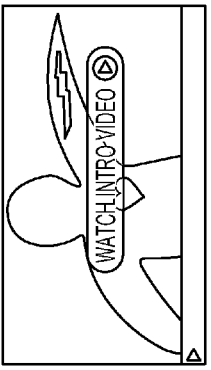
FIG. 3 illustrates an example of an interface as rendered in a browser application.

FIG. 3 illustrates an example of an interface as rendered in a browser application. Interface 300 is an example of an interface that can be presented to a student (via a browser application installed on the student's client device) by a web frontend running on platform 104. As shown in FIG. 3, the Jane is presented a homepage/landing page of a course on "Introductory Human Physiology." The page includes information about the course, such as the instructors and course description. At 302, options for taking the course are shown. In this example, Jane is presented with options to take the course on a free "basic" track (304) or on an identity-verified track (306).

Figure 4:
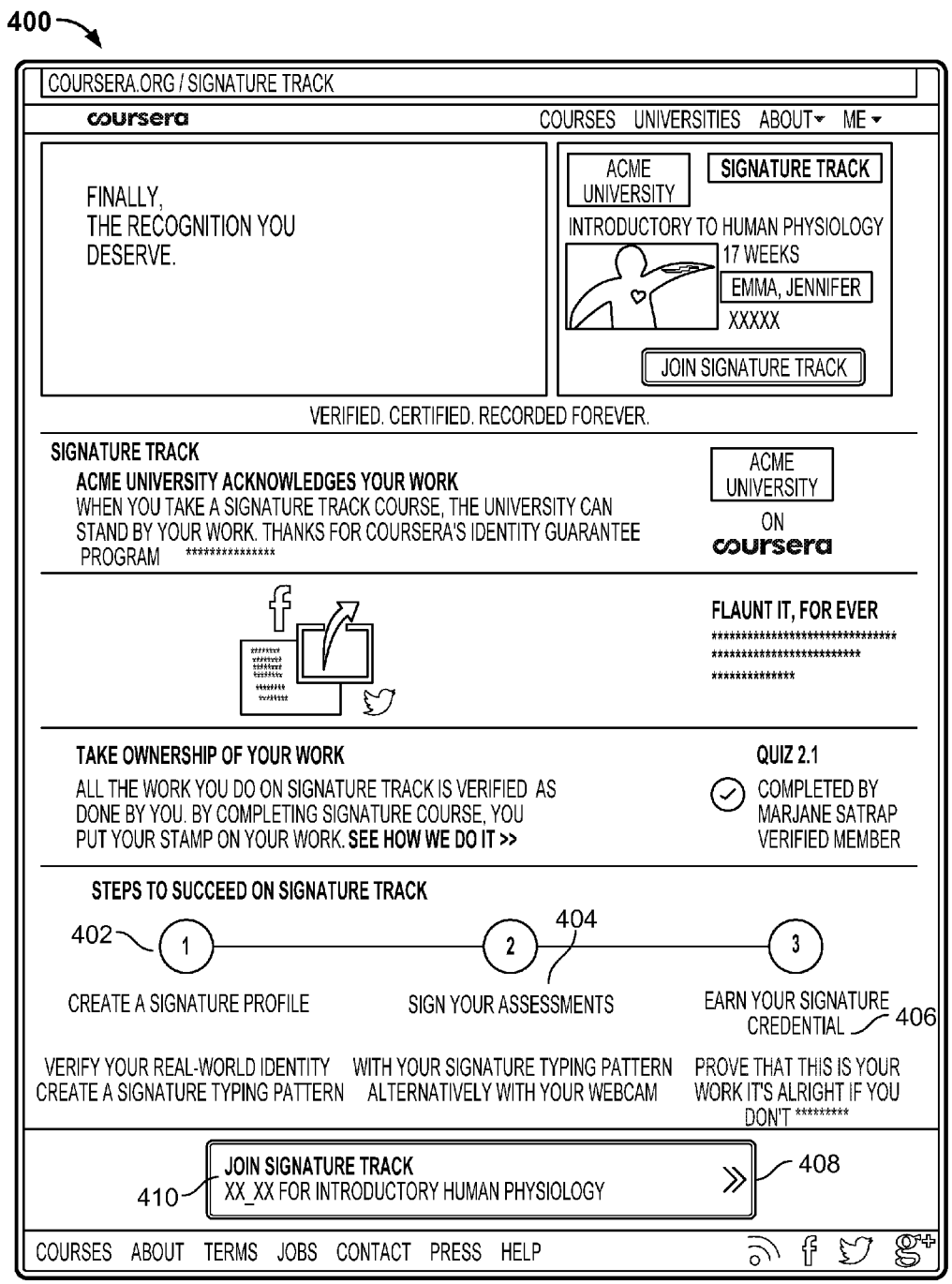
FIG. 4 illustrates an example of an interface as rendered in a browser application.

FIG. 4 illustrates an example of an interface as rendered in a browser application. Interface 400 is an example of an interface that can be presented to a student (via a browser application installed on their client device) by a web frontend running on platform 104. As shown in FIG. 4, Jane is presented with overview information regarding taking an identity-verified track, such as the enrollment process (402), authentication process (404), and verified credentials (406). At 408, Jane is presented with a button to join the identity-verified track of the "Introductory Human Physiology" course, which also includes information regarding the price to join the identity-verified track (410).

Example Enrollment Interfaces

The following example interfaces follow Jane Smith as she performs various steps in enrolling/registering in the identity-verified track for the "Introductory Human Physiology" course. In this example, Jane has an account with a MOOC platform, but has not previously enrolled in an identity-verified track for a course, and is thus prompted to create a registered/identity-verified profile that is used to verify Jane's real-world identity.

Figure 5:
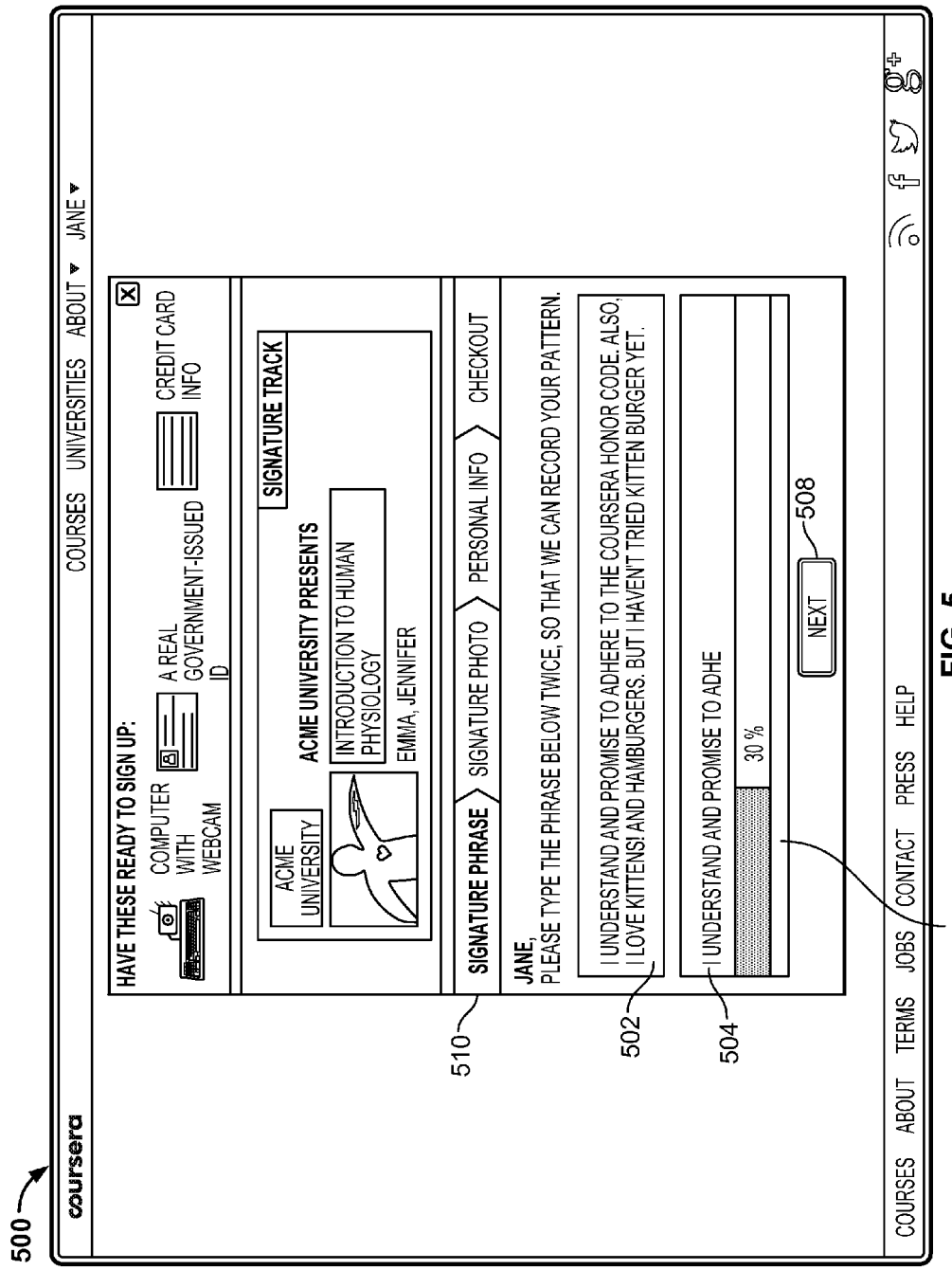
FIG. 5 illustrates an example of an interface as rendered in a browser application.

FIG. 5 illustrates an example of an interface as rendered in a browser application. Interface 500 is an example of an interface that can be presented to a student (via a browser application installed on their client device) by a web frontend running on platform 104. As shown in FIG. 5, Jane is presented with a page for a first step in the enrollment process, which includes collecting a typing sample for Jane (indicated at 510). Jane is prompted to type in the phrase (502) "I understand and promise to adhere to the Coursera (e.g., MOOC platform operator) Honor code. Also, I love kittens! And hamburgers. But I haven't tried Kitten Burger yet." Jane types in the phrase in field 504. At 506, a progress bar indicating her progress in typing out the phrase (or capture of her typing sample) is shown. At 508, a button is presented for progressing to the next step in the enrollment process.

Figure 6:
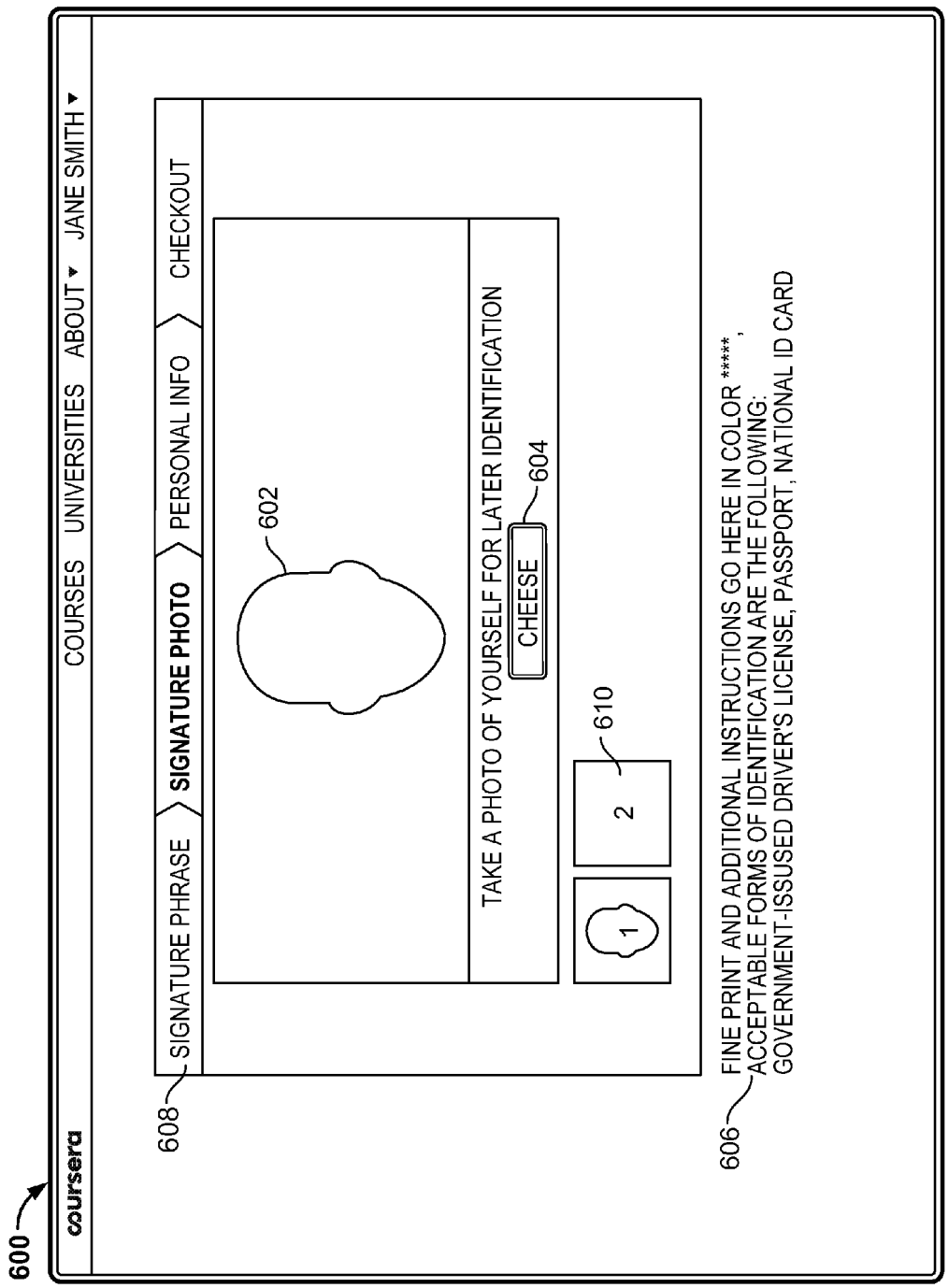
FIG. 6 illustrates an example of an interface as rendered in a browser application.

FIG. 6 illustrates an example of an interface as rendered in a browser application. Interface 600 is an example of an interface that can be presented to a student (via a browser application installed on their client device) by a web frontend running on platform 104. As shown in FIG. 6, after Jane has completed providing her typing sample (e.g., indicated at 608 where the color of the heading for the previous step has changed color), Jane is presented with a page (e.g., after hitting "Next" button 508 of FIG. 5) prompting her to take a photo of herself for later identification (e.g., during submission of a coursework assignment). In this example, a popup was previously displayed, requesting permission from Jane to use her webcam to capture photos. At 602, guidelines for how Jane should align her face are shown. At 604, Jane takes a picture of herself by clicking the "Cheese" button. At 606, information regarding acceptable forms of identification (of which a photo will be taken in the next step of the enrollment process) are described, which include a government-issued driver's license, passport, nation ID card, etc. At 610, previews of the photos Jane has taken can be displayed.

Figure 7:
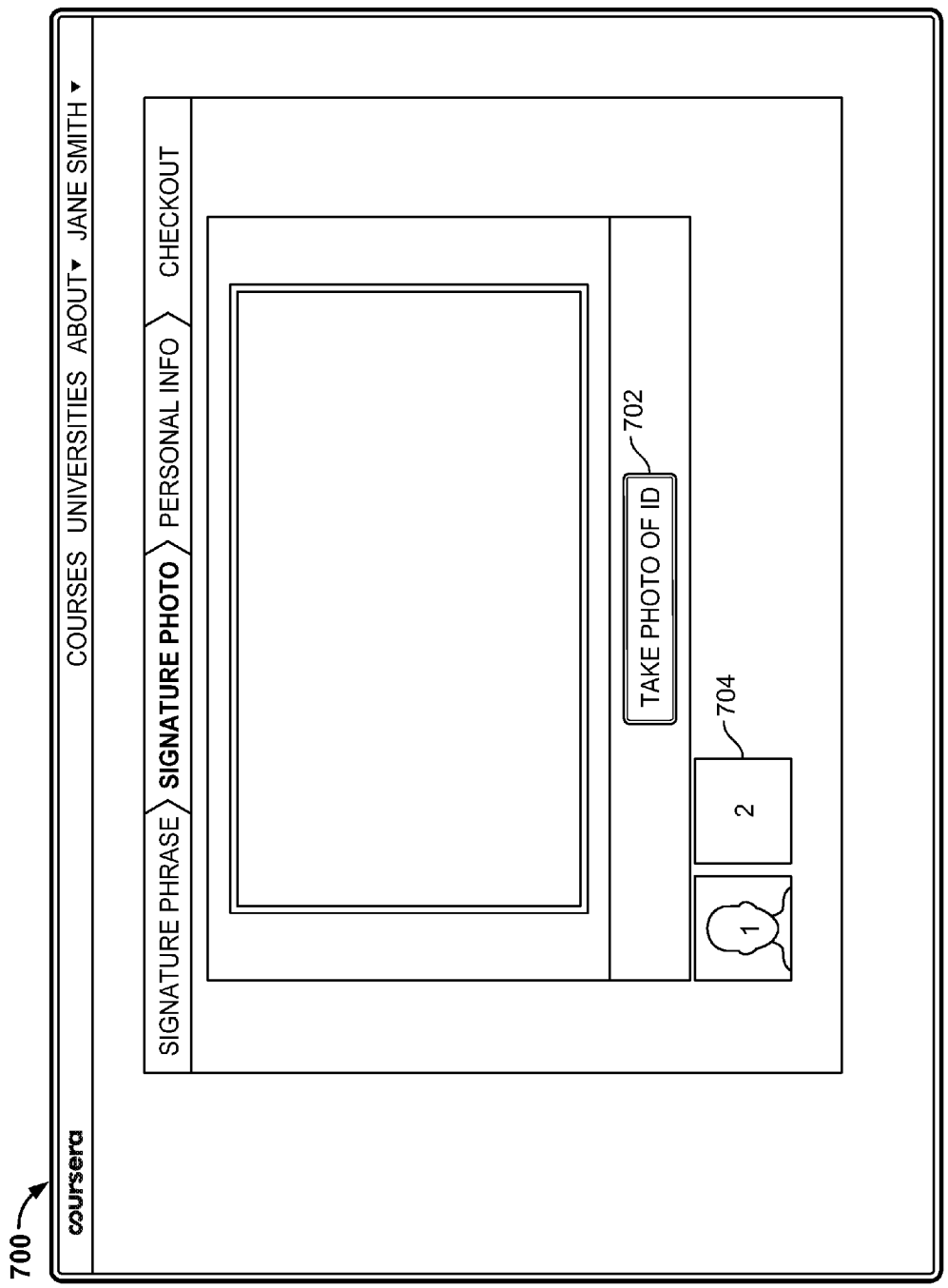
FIG. 7 illustrates an example of an interface as rendered in a browser application.

FIG. 7 illustrates an example of an interface as rendered in a browser application. Interface 700 is an example of an interface that can be presented to a student (via a browser application installed on their client device) by a web frontend running on platform 104. As shown in FIG. 7, Jane is presented (e.g., after hitting "Cheese" button 604 of FIG. 6 and taking her photo) with a prompt to take a photo of her ID documentation, example acceptable forms of which were described in the previous interface screen. Jane can hit button "Take Photo of ID" 702 to take a photo of her ID documentation. Previews of the photos she has taken can be rendered at 704.

Figure 8:
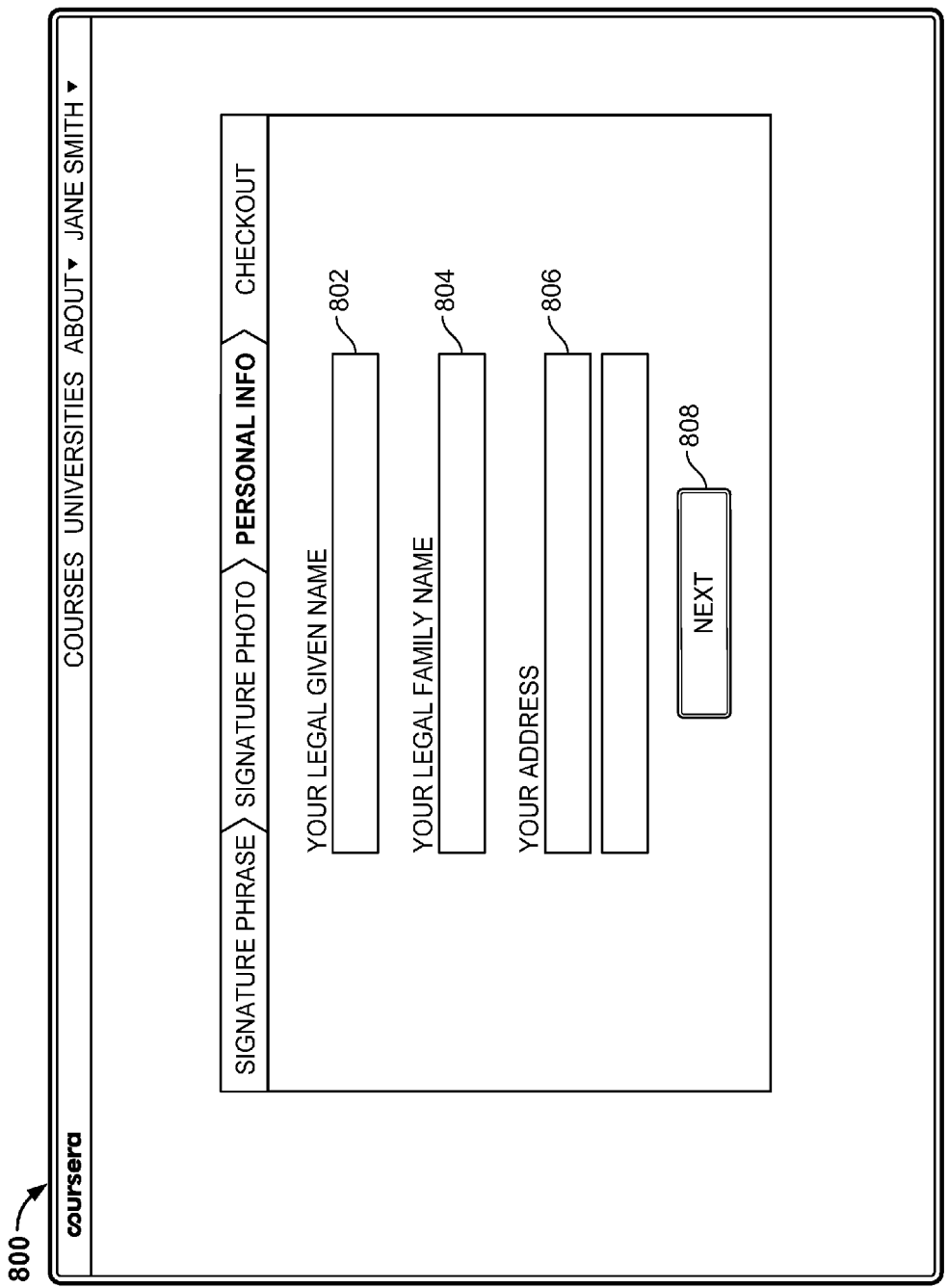
FIG. 8 illustrates an example of an interface as rendered in a browser application.

FIG. 8 illustrates an example of an interface as rendered in a browser application. Interface 800 is an example of an interface that can be presented to a student (via a browser application installed on their client device) by a web frontend running on platform 104. As shown in FIG. 8, Jane is presented (e.g., after hitting "Take Photo of ID" button 702 of FIG. 7) with a prompt to enter her personal information, which will be compared against the information on her ID documentation, which she previously took a picture of. In this example, fields for entering Jane's legal given name (802), legal family name (804), and address (806) are shown. Upon completion of entering her personal information, Jane can proceed to the next step (checkout) by hitting the "Next" button (808).

Figure 9:
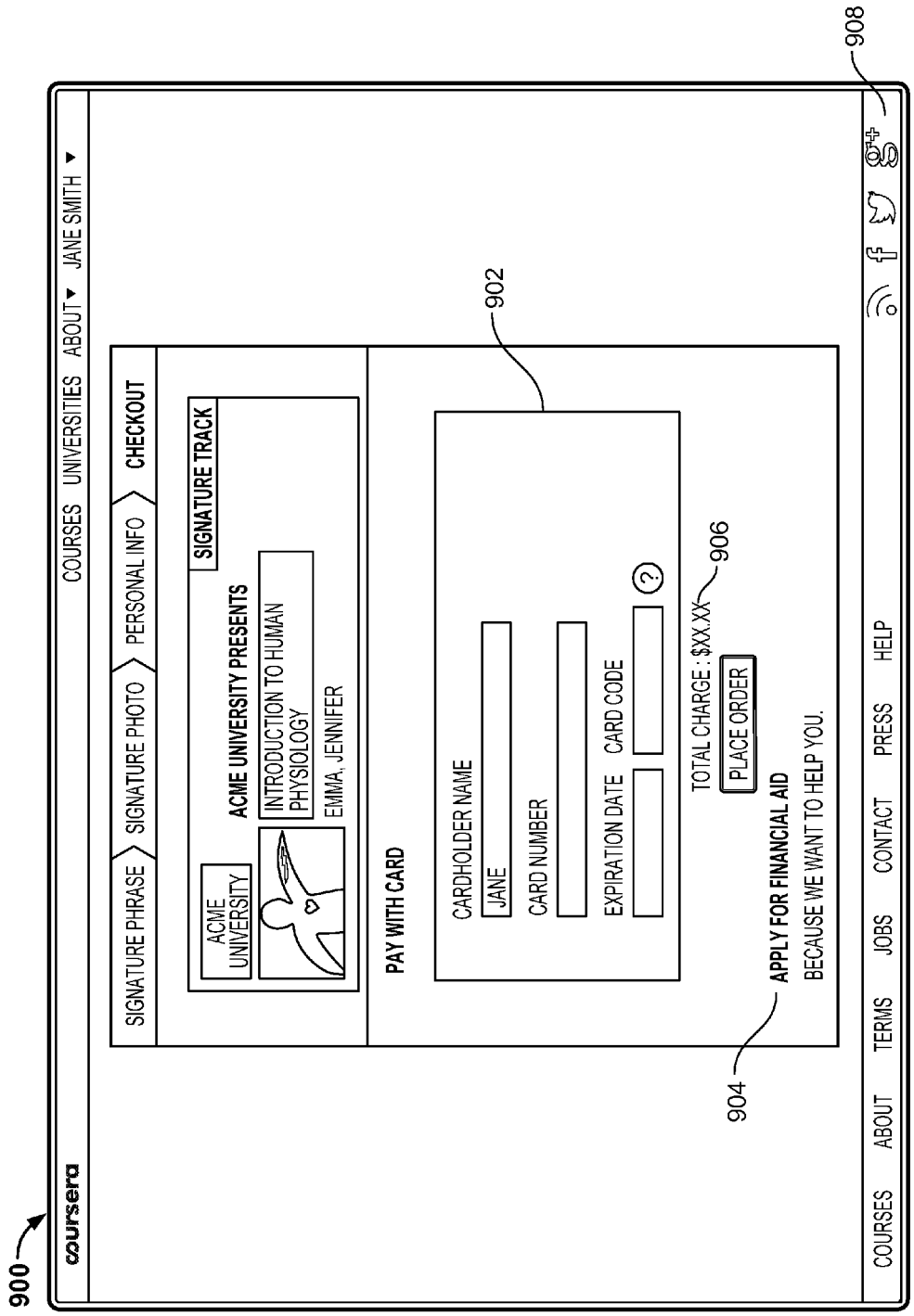
FIG. 9 illustrates an example of an interface as rendered in a browser application.

FIG. 9 illustrates an example of an interface as rendered in a browser application. Interface 900 is an example of an interface that can be presented to a student (via a browser application installed on their client device) by a web frontend running on platform 104. As shown in FIG. 9, after providing the requested information in the previous steps (typing sample, webcam photo portrait, webcam capture of ID documentation, and personal information), Jane is presented (e.g., after hitting "Next" button 808 of FIG. 8) a checkout screen to pay for joining the identity-verified track of the "Introduction to Human Physiology Course." At 902, Jane is provided fields for entering her credit card information (e.g., cardholder name, card number, expiration date, card code, etc.). At 904, Jane is also provided with an option for applying for financial aid, which is provided as an option for need-based students that have opted in an identity-verified course track. At 906, Jane is presented with the total charge for entering the identity-verified track and can place her order by clicking on the "Place Order" button.

At 908, Jane has the option of letting others know about her joining the identity-verified track for the course via RSS feeds and various networks (e.g., social networks, professional networks, employment/job networks, etc.) such as Facebook®, Twitter®, and Google+® LinkedIn®, etc.

In some embodiments, if Jane has previously enrolled in the identity-verified track of a different course and already created an identity-verified profile, then she is directly taken to the payment screen when selecting to enroll for the identity-verified track of the current course, and bypasses the previous steps for collecting enrollment information.

Example Interfaces for Taking the Identity-Verified Track of a Course

The following example interfaces follow Jane Smith as she takes/completes the identity-verified track for the "Introductory Human Physiology" course.

FIG. 10 illustrates an example of an interface as rendered in a browser application. Interface 1000 is an example of an interface that can be presented to a student (via a browser application installed on their client device) by a web frontend running on platform 104. As shown in FIG. 10, Jane is presented with the homepage/landing page of the course that she has enrolled in, "Introduction to Human Physiology." At 1002, an indication that Jane has enrolled in the identity-verified track of the course is shown.

Figure 11:
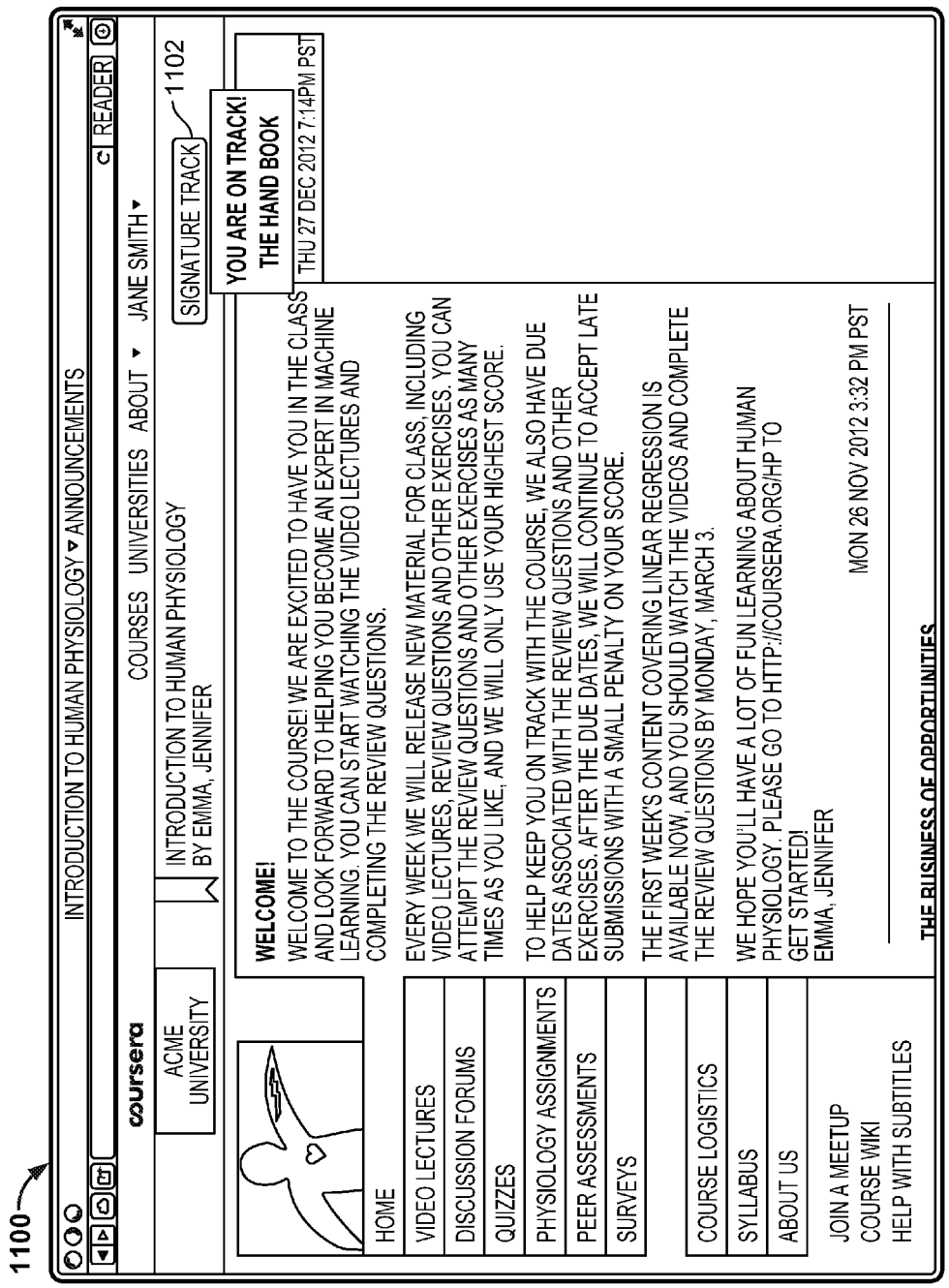
FIG. 11 illustrates an example of an interface as rendered in a browser application.

FIG. 11 illustrates an example of an interface as rendered in a browser application. Interface 1100 is an example of an interface that can be presented to a student (via a browser application installed on their client device) by a web frontend running on platform 104. In this example, interface 1100 continues the example of interface 1000 of FIG. 10. As shown in FIG. 11, at 1102, Jane is shown (e.g., in response to click on, or hovering over, the "SIGNATURE track" text) an indication that she is on track, and is provided a link to a handbook regarding identity-verified tracks for courses (e.g., FAQ).

Figure 12:
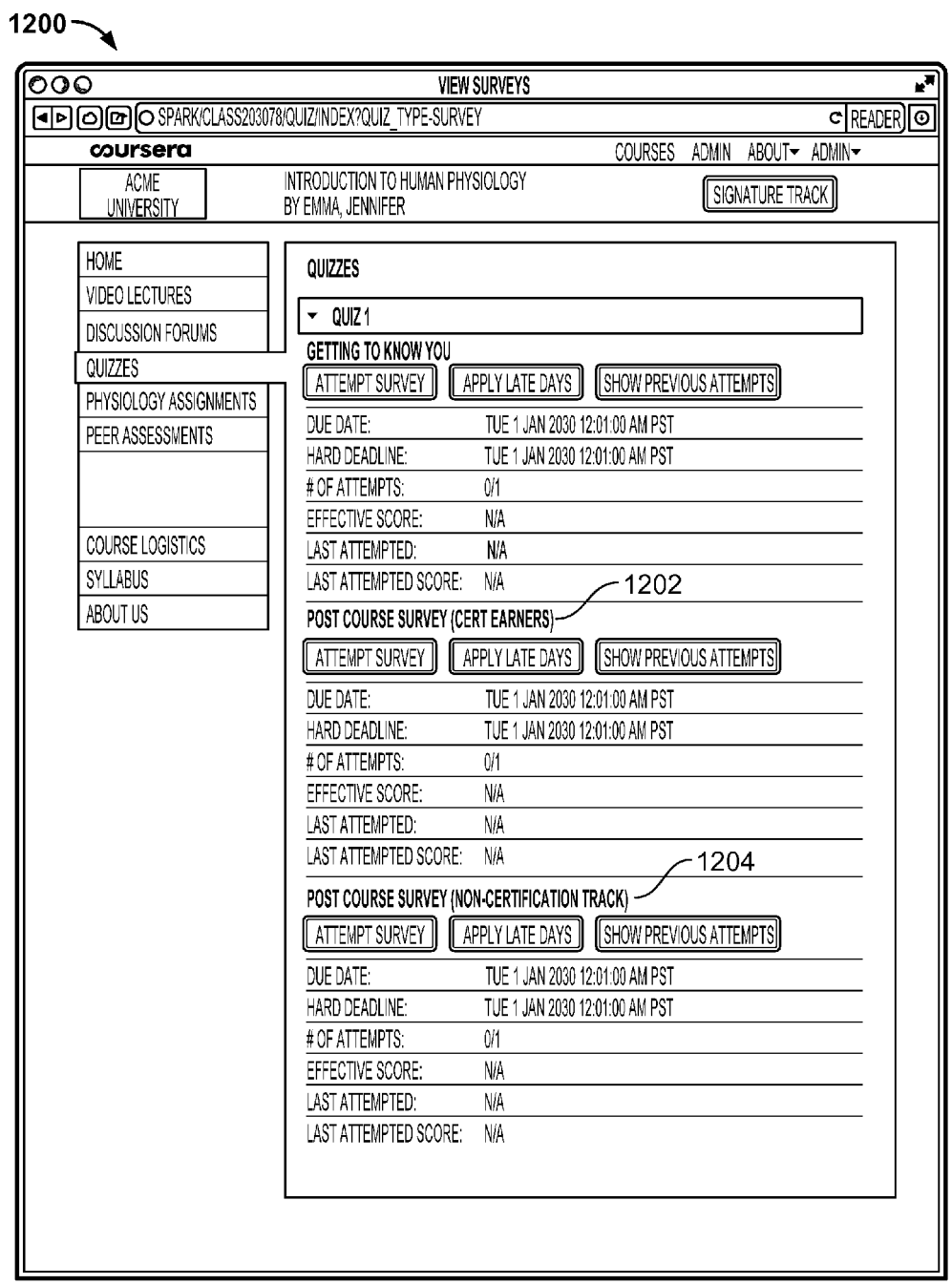
FIG. 12 illustrates an example of an interface as rendered in a browser application.

FIG. 12 illustrates an example of an interface as rendered in a browser application. Interface 1200 is an example of an interface that can be presented to a student (via a browser application installed on their client device) by a web frontend running on platform 104. As shown in FIG. 12, Jane is provided an overview of various quizzes for the course. In the example shown, there are two versions of the post course survey, one for certificate earners (1202) such as Jane who is enrolled in the identity-verified track, and one for students on the non-certification track (1204).

Figure 13:
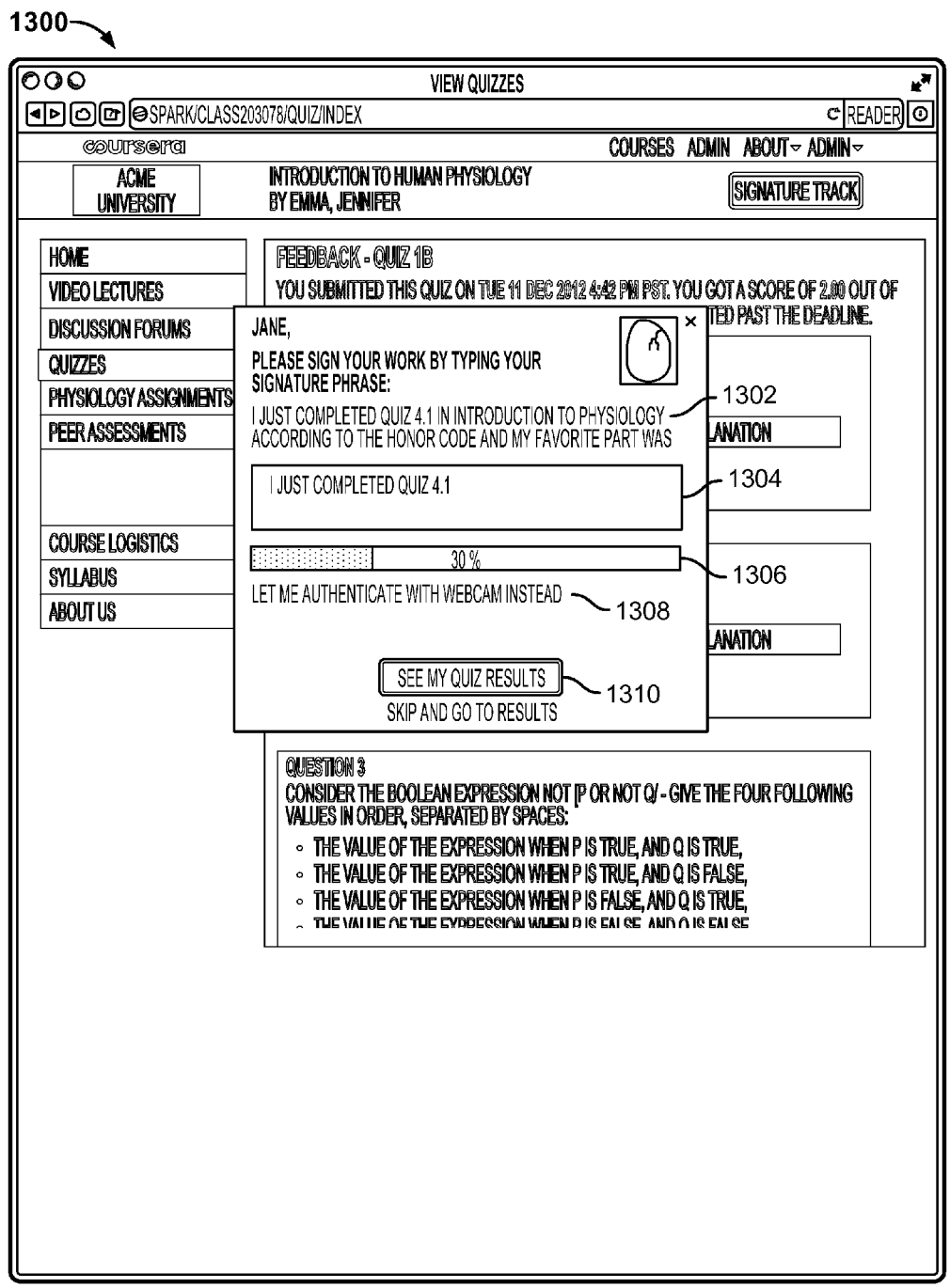
FIG. 13 illustrates an example of an interface as rendered in a browser application.

FIG. 13 illustrates an example of an interface as rendered in a browser application. Interface 1300 is an example of an interface that can be presented to a student (via a browser application installed on their client device) by a web frontend running on platform 104. As shown in FIG. 13, Jane has submitted a first assessment (Quiz 1b) and is prompted to sign her work (i.e., authenticate/verify her identity). In this example, Jane is prompted to enter in the phrase (1302) "I just completed quiz 4.1 in Introduction to Physiology according to the honor code and my favorite part was." The phrase may be the same or different to the phrase that Jane entered during the enrollment/registration phase. Additionally, the phrase may be provided by the MOOC platform operator, but also allow Jane to enter her own continuing text (i.e., allowing her to type in what her favorite part of the quiz was) to complete the phrase.

Field 1304 is made available to Jane to type in the phrase. At 1306, a progress bar indicating her progress/level or degree of completion (e.g., 30% of presented characters entered correctly) or authentication (e.g., 30% complete, 30% match to enrollment phrase, 30% authenticated, etc.) in typing in the phrase is shown. At 1308, Jane is also provided with the option to authenticate herself via a webcam photo instead of authentication via the typing sample. At 1310, Jane is provided with an option to see her quiz results or skip and go to results.

Figure 14:
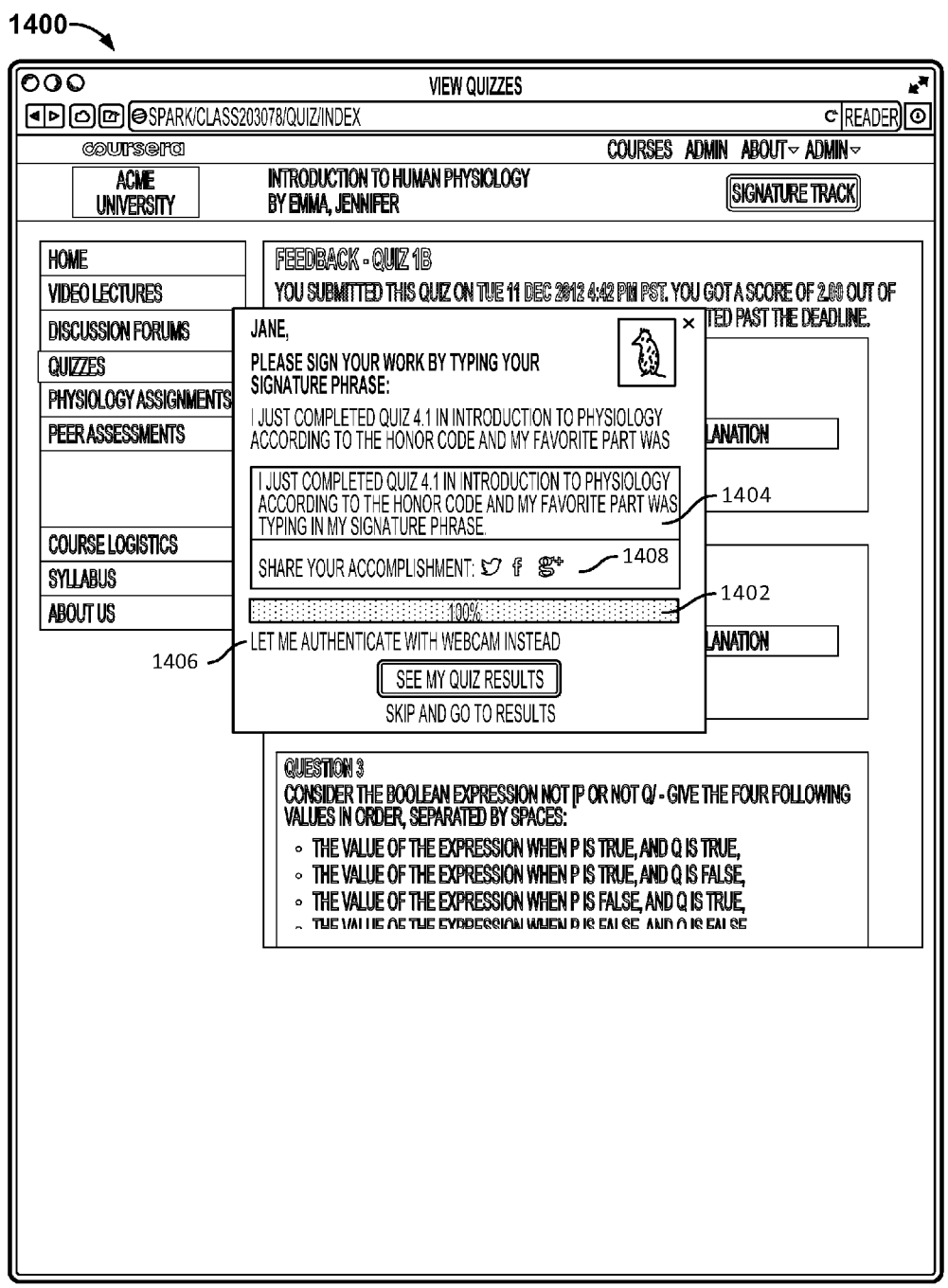
FIG. 14 illustrates an example of an interface as rendered in a browser application.

FIG. 14 illustrates an example of an interface as rendered in a browser application. Interface 1400 is an example of an interface that can be presented to a student (via a browser application installed on their client device) by a web frontend running on platform 104. In this example, the interface shown in FIG. 14 continues the example of interface 1300 of FIG. 13, where Jane has completed entry of the prompted phrase. In this example, progress bar 1402 indicates 100% progress and has changed to the color green to indicate completion. In some embodiments, the indication is an indication that Jane's identity has been successfully authenticated for the quiz. In this example, the phrase that Jane entered included the prompt provided to her, as well her own text regarding her favorite part, which was "typing in my signature phrase" (1404).

At 1406, while Jane has completed entry of an authentication phrase in this example, she is still provided the option to authenticate via a webcam photo capture instead. At 1408, the user is provided with options to share their accomplishment in completing the quiz, for example via social network.

Figure 15:
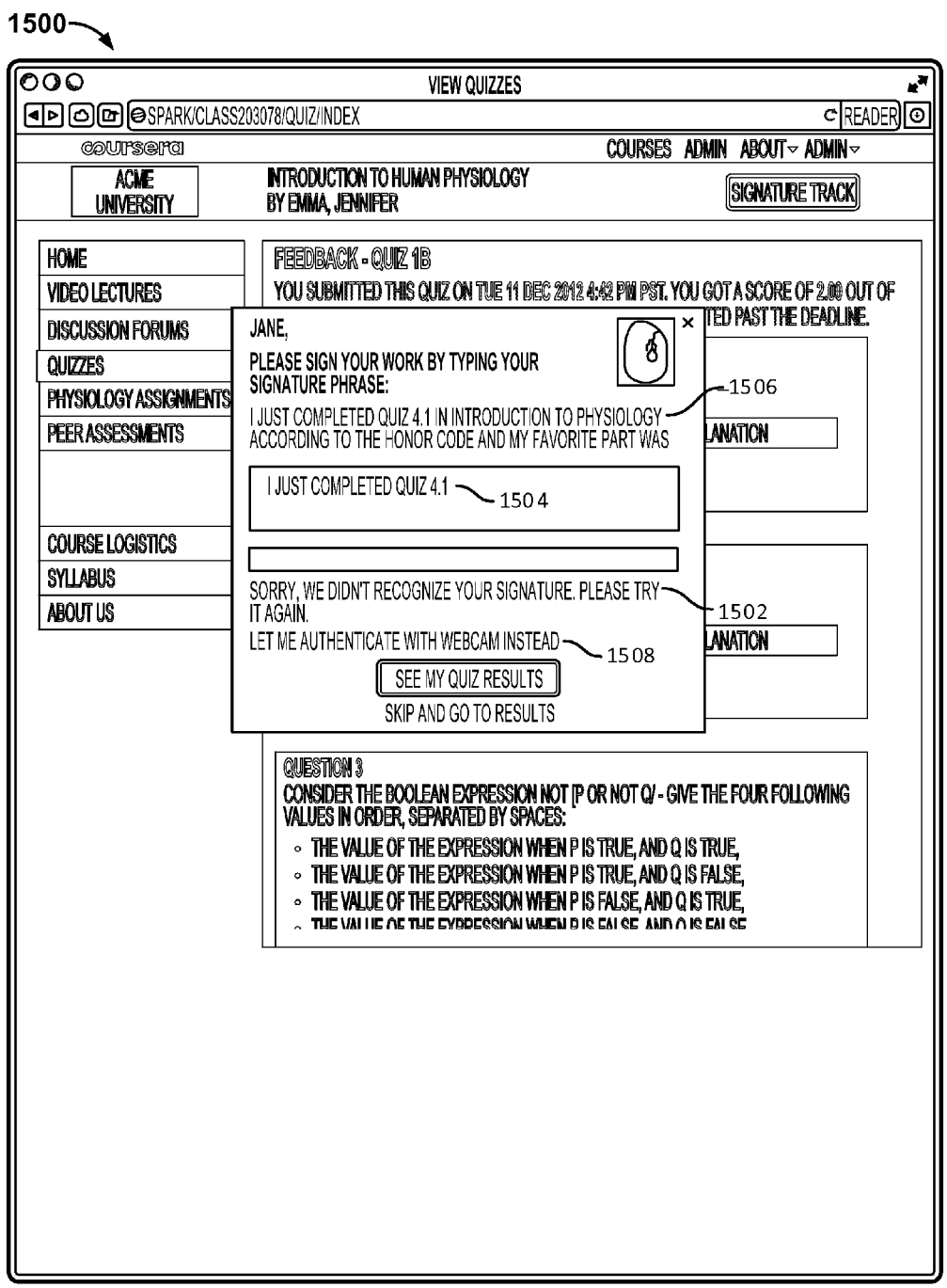
FIG. 15 illustrates an example of an interface as rendered in a browser application.

FIG. 15 illustrates an example of an interface as rendered in a browser application. Interface 1500 is an example of an interface that can be presented to a student (via a browser application installed on their client device) by a web frontend running on platform 104. As shown in FIG. 15, message 1502 indicates that Jane's entry of her typing sample was not successful and that her typing sample has not been recognized (and that Jane's identity could not be verified). In this example, Jane has only entered a portion (1504) of the prompted text (1506), and is prompted to enter her phrase again. At 1508, Jane is provided with a link to authenticate via a webcam photo instead.

Figure 16:
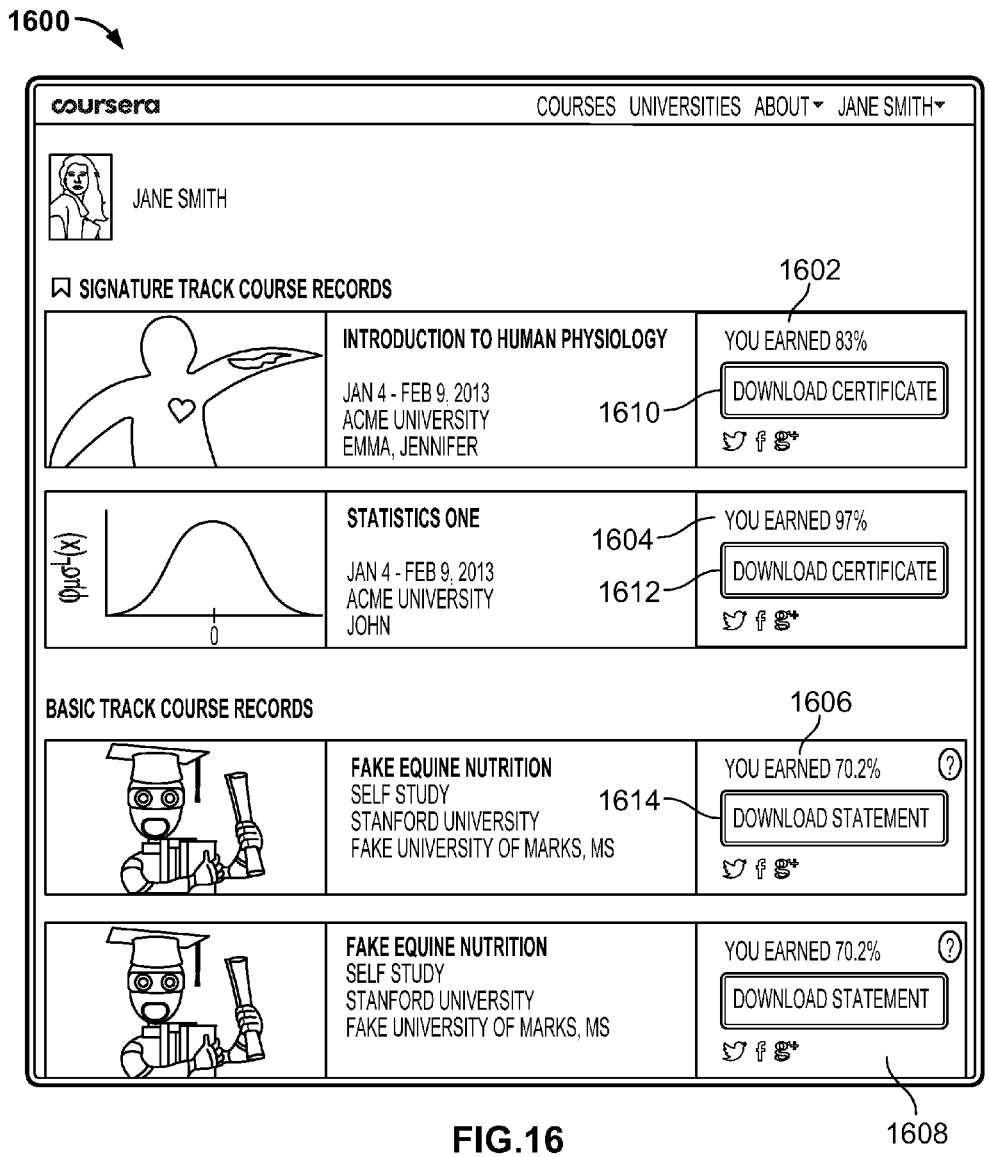
FIG. 16 illustrates an example of an interface as rendered in a browser application.

Example Interfaces and Credentials Upon Completion of the Identity-Verified Track of a Course FIG. 16 illustrates an example of an interface as rendered in a browser application. Interface 1600 is an example of an interface that can be presented to a student (via a browser application installed on their client device) by a web frontend running on platform 104. As shown in FIG. 16, Jane's course records are displayed. In this example, Jane has taken four courses, two of which (1602 and 1604) were taken on an identity-verified track, and the other two of which were taken on the basic track (1606 and 1608). The records page shown here has grouped her courses according to the type of track she took the courses on. As courses 1602 and 1604 have been completed on the identity-verified track, Jane has been issued verified credentials such as verified certificates which can be downloaded for the respective courses by clicking on buttons 1610 and 1612. This is in contrast to the basic track courses 1606 and 1608 which Jane has completed, which do not offer verified certificates (but offer statements). In the example shown, in addition to the option to download verified certificates and statements for completed courses, the course records page also shows the score (e.g., percentage score) earned by Jane in her courses. In the example shown, Jane also receives statements (in contrast to verified certificates) for completing basic courses, which can be downloaded, for example, by clicking a button such as "Download Statement" button 1614.

Figure 17:
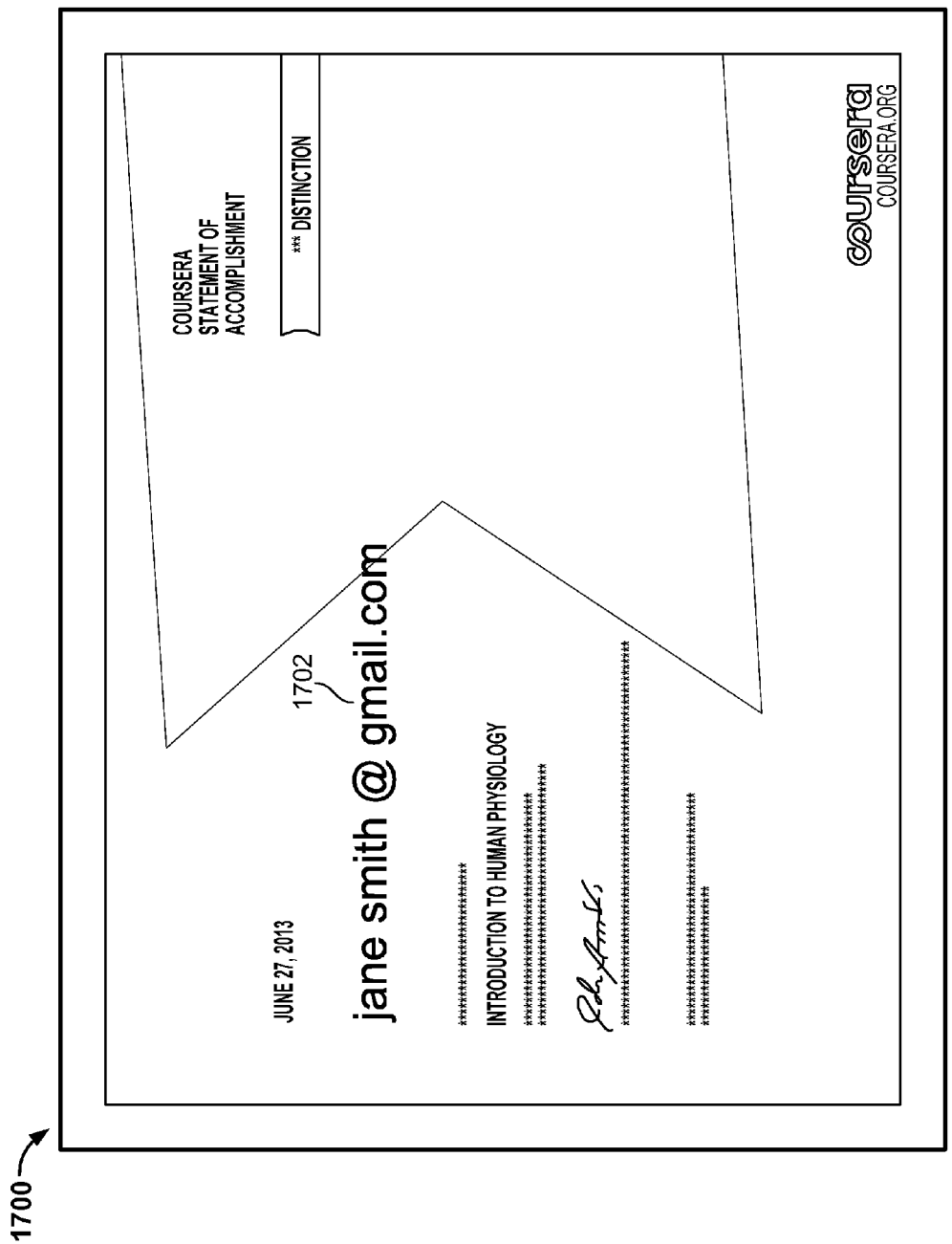
FIG. 17 depicts an example of a statement issued for completion of a basic track of a course.

FIG. 17 depicts an example of a statement issued for completion of a basic track of a course. In some embodiments, the statement is downloaded via a course records page (e.g., by pressing a button such as "Download Certificate" 1610 of FIG. 16). In this example, rather than Jane's legal name, the statement is shown at 1702 as being attributed to her email address (e.g., her account user name when signing up for the MOOC platform).

Figure 18:
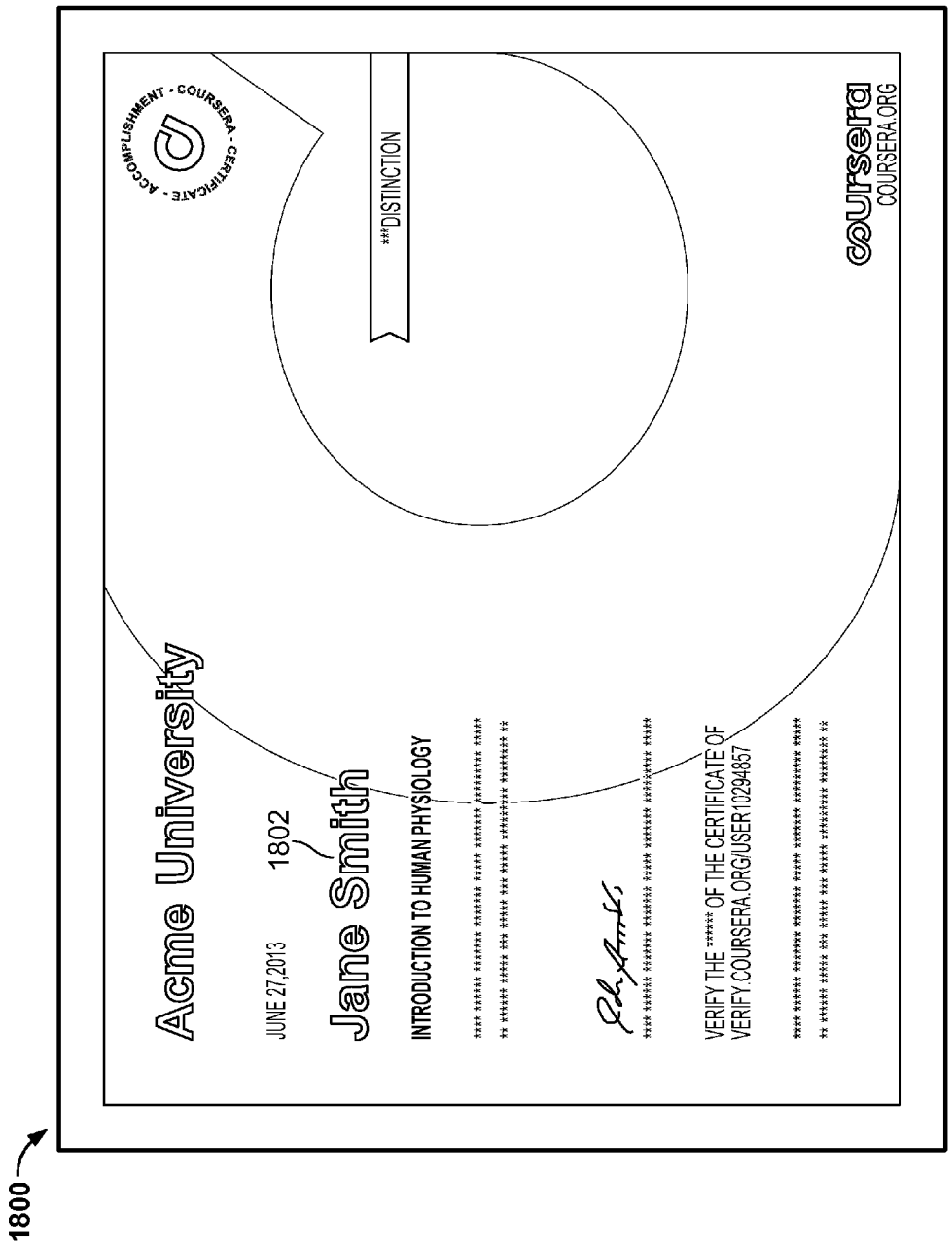
FIG. 18 depicts an example of a verified certificate issued upon completion of the identity-verified track of a course.

FIG. 18 depicts an example of a verified certificate issued upon completion of the identity-verified track of a course. In this example, Jane has received a verified certificate for completing an identity-verified track of Introduction to Human Physiology. In some embodiments, Jane's verified certificate is downloaded via her course records page (e.g., by pressing a button such as "Download Certificate" 1610 of FIG. 16). In some embodiments, Jane receives her certificate via email. As shown in this example, in contrast to the statement of FIG. 17 which is attributed to Jane's email address, Jane's verified certificate includes her verified legal name, accurately attributing her accomplishment of completing the course to her real identity (which has been verified using the processes described above). In this example, the verified certificate includes the date of issuance and is issued by both the university which provided the course as well as the MOOC platform provider.

Figure 19:
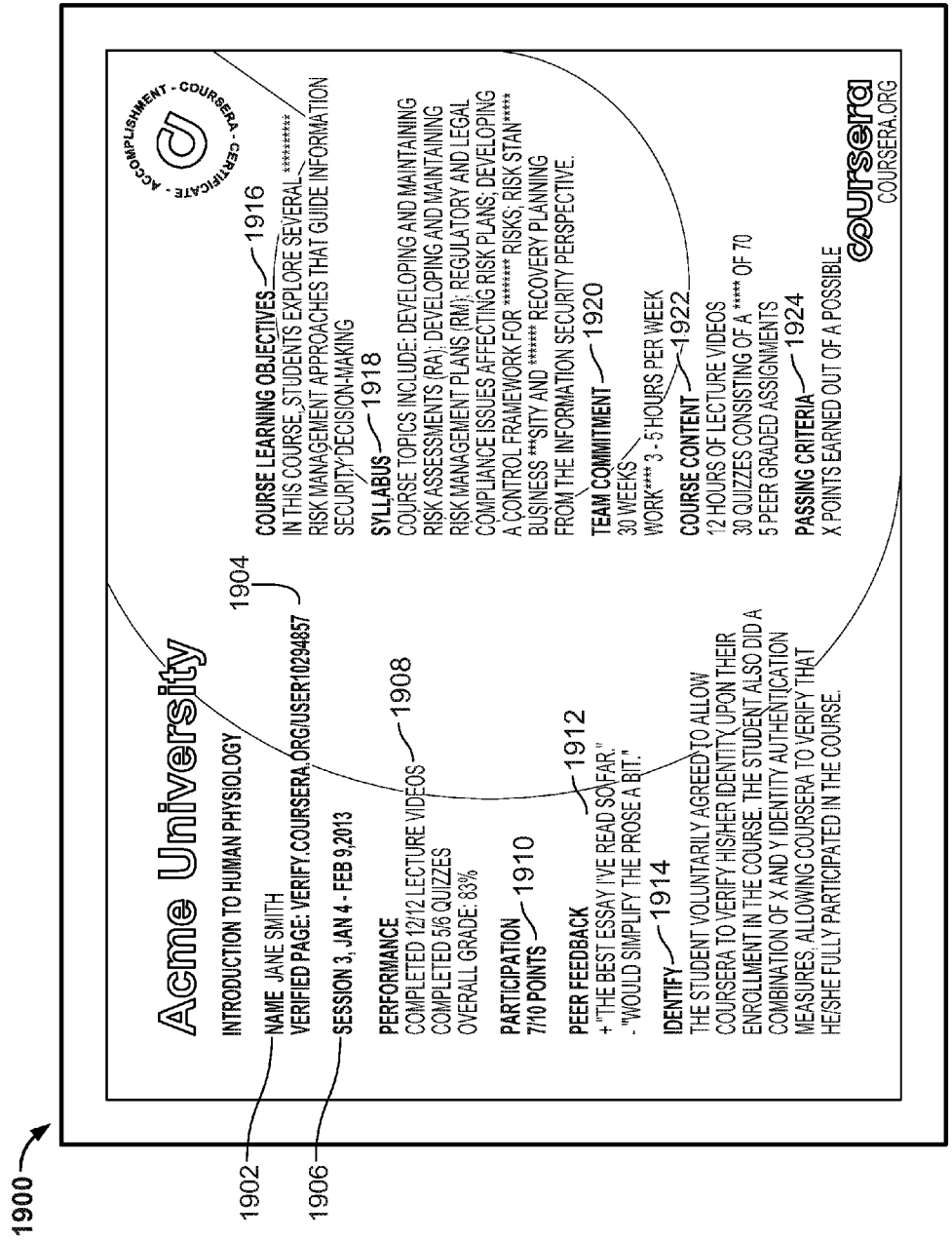
FIG. 19 depicts an example of a verified certificate issued upon completion of the identity-verified track of a course.

FIG. 19 depicts an example of a verified certificate issued upon completion of the identity-verified track of a course. In this example, Jane has received a certifiable course record for completing the identity-verified track of Introduction to Human Physiology. As shown in this example, certifiable course record 1900 for Introduction to Human Physiology includes Jane's verified, legal name (1902), a verified URL (1904) that is a URL for a verified page that guarantees the authenticity of the student's certificate (which can be shared with others), the session and period (1906) of the course that Jane took, her course performance 1908 (e.g., completed lecture videos, completed quizzes, overall course grade), her course participation (1910), peer feedback (1912), and a statement (1914) regarding the verification of Jane's identity when taking the identity-verified track of the course and the measures undertaken to allow the MOOC platform to verify Jane's identity upon enrollment in the course and to verify that Jane has fully participated in the course. In this example, the certifiable course record also includes course description information such as course learning objectives (1916), syllabus (1918), time commitment (1920), course content (1922), and passing criteria (1924) for the course.

Figure 20A:
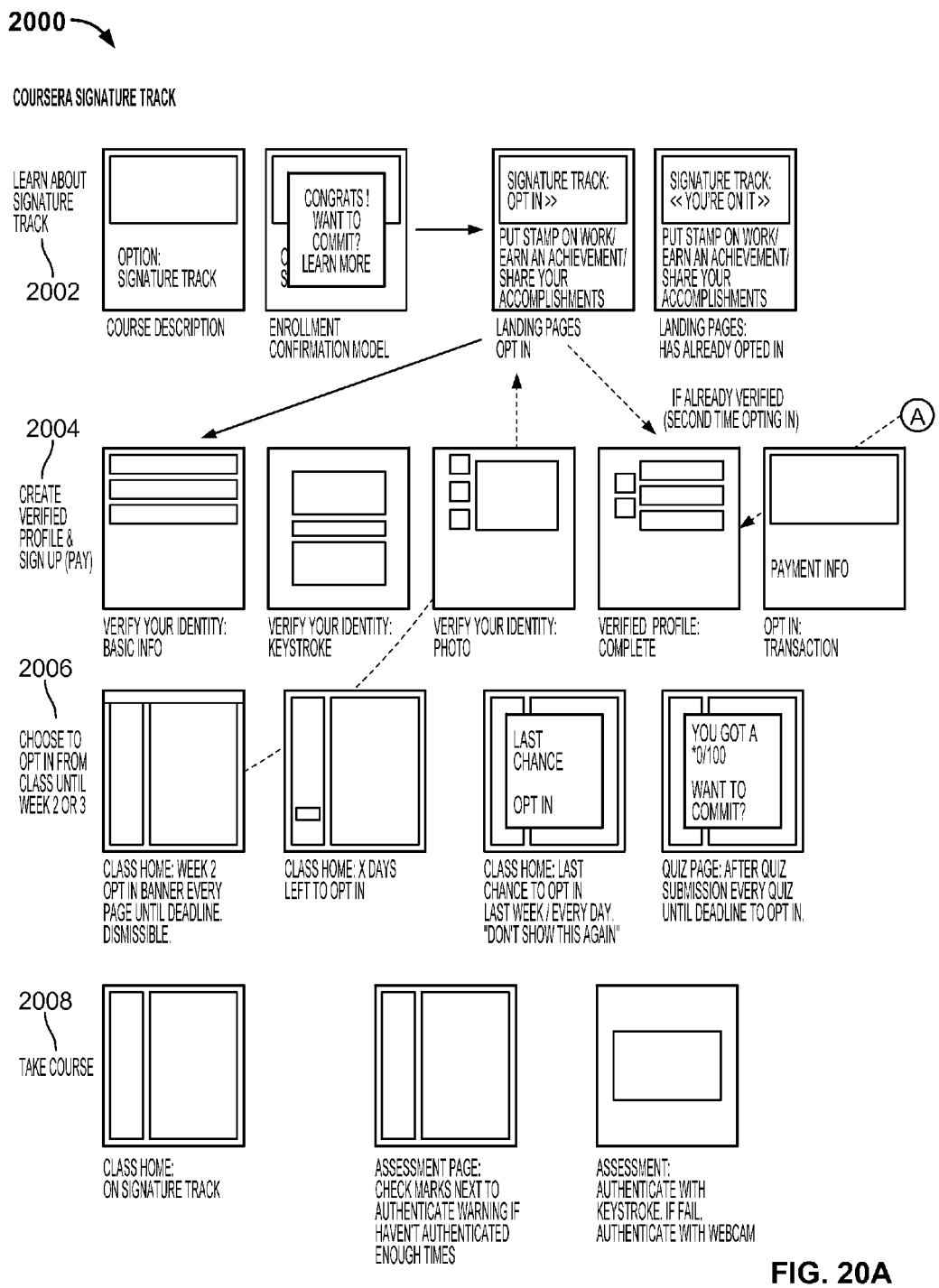
FIG. 20A illustrates an example of a web-flow for identity verification for online education.
Figure 20B:
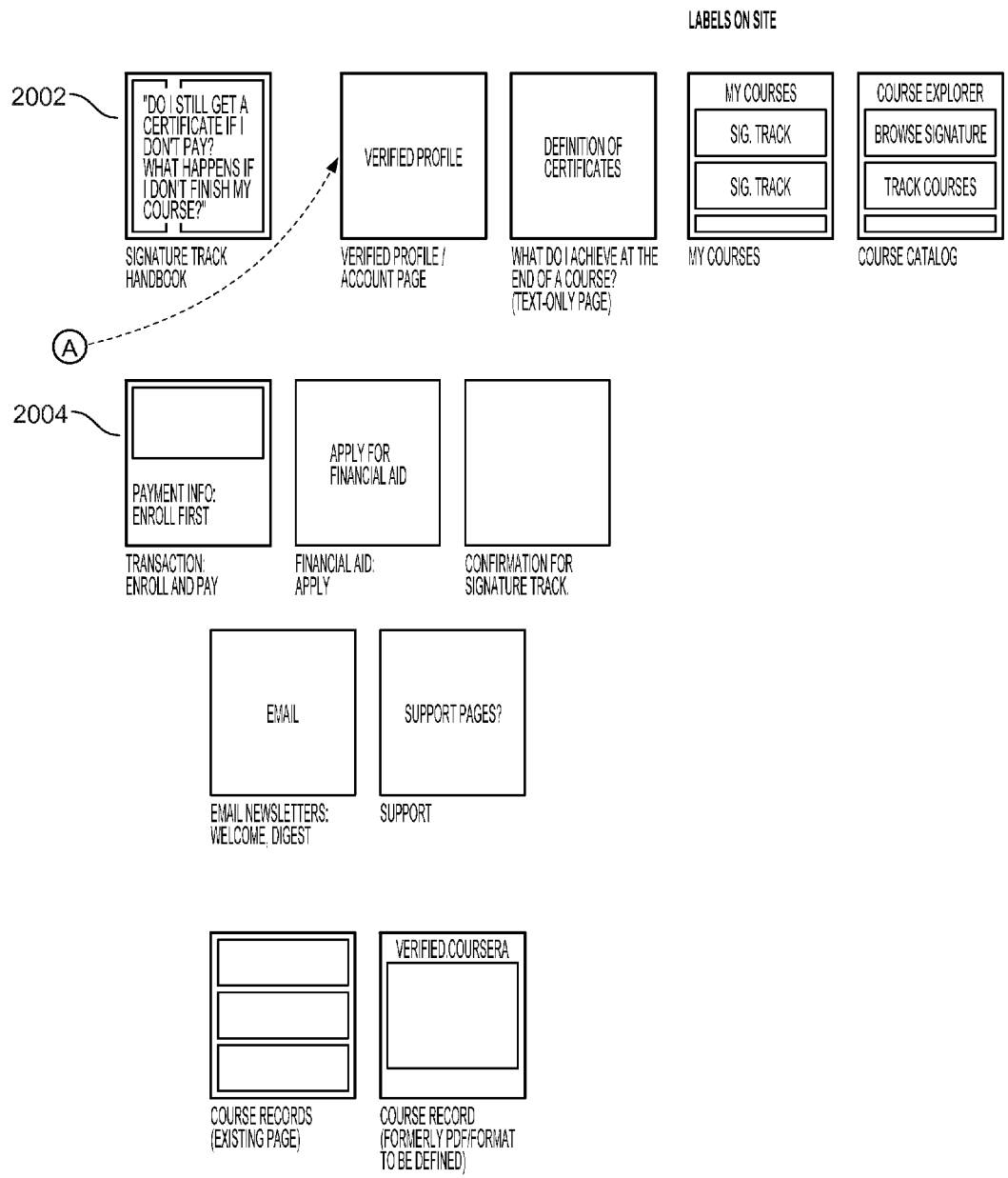
FIG. 20B illustrates an example of a web-flow for identity verification for online education.

FIGS. 20A and 20B illustrate an example of a web-flow for identity verification for online education. In the example shown, a diagram of the processes described in the example architecture and workflow described above is shown. As shown in the example, various pages (e.g., provided by instances running on platform 104) and their relationships are shown, for example, for learning about identity-verified course tracks (2002, shown on FIG. 20A and continuing on FIG. 20B), creating verified profiles and signing up/paying for identified-verified course tracks (2004, shown on FIG. 20A and continuing on FIG. 20B), join periods for identity-verified tracks (2006), as well as identity verification measures taken during a course (2008). Examples of the pages shown in the example diagram are described in the example interfaces described above.

In the example shown, learning about identity-verified course tracks (2002) includes presenting pages for learning about identity-verified track option, enrollment confirmation, opting in to the track, landing pages for if the user has already opted in. FAQ pages can also be provided.

In the example shown, pages for creating a verified profile and sign up/payment (2004) include presenting pages for verifying one's identity (e.g., during an enrollment phase). Pages for verifying one's identity include basic information entry (e.g., personal information such as legal first and last names, address, etc.), keystroke entry (e.g., to create a unique typing profile for the user), photo capture (e.g., of user's headshot and photo ID documentation), and a completion page (which a user can be skipped to if they have already previously had their identity verified, for example, when applying in the identity-verified track for another course). Upon completion of the verified profile, the created verified profile can be linked with a user's account page. Process 2004 also includes pages for transactions such as payment information collection for enrolling in the identity-verified track as well as applying for financial aid. Confirmation can also be provided to a user of completion of the identity-verified track registration process.

In the example shown, pages for allowing a user to opt into the identity-verified track of a course (e.g., from the basic track) within a join period (e.g., within first 2 or 3 weeks of the start of the course) include course homepages that include banners that show the deadline for the join period (which may be dismissible), the number of days left to opt into the identity-verified track, a last chance notification for joining, as well a notification to opt in after submission of assignments until the deadline is reached.

In the example shown, pages presented during the taking of the identity-verified track of a course include an assessment page warning if the user has not been authenticated enough times, as well as pages for allowing user to authenticate via keystroke typing samples or with webcam captures.

Other pages shown in the example (shown in FIG. 20B) include course records pages, support pages, newsletters/digests, personalized course listings, course catalogs, etc. which can be provided/displayed (e.g., via a web front-end) to a student.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        in response to receiving a notification of a submission event, prompt a user, via an interface, to provide a first type of authentication information wherein the first type of authentication information is a typing sample provided by the user entering an authentication phrase using a keyboard, wherein the submission event is the submission of the user's coursework comprising a quiz in an online course;

compare authentication information received via the interface to stored enrollment information associated with the user with which the received authentication information is associated, wherein the stored enrollment information includes information the first type of authentication information and a second type of authentication information collected during an enrollment phase, and in the event that a match is determined based on the comparison, verify the identity of the user; and in the event that a match is not determined based on the comparison, prompt the user to provide the second type of authentication information; and a memory coupled to the processor and configured to provide the processor with instructions, wherein the processor is configured to determine whether to issue the user a verified credential based on the comparison and on the completion of the user's coursework.

2. The system recited in claim 1, wherein the verified credential includes a verified certificate.

3. The system recited in claim 1, wherein the user is prompted to provide the typing sample by entering an authentication phrase.

4. The system recited in claim 3, wherein the comparing includes determining whether the authentication typing sample matches an enrollment typing sample captured during the enrollment phase based at least in part on similarity criteria.

5. The system recited in claim 4, wherein the authentication typing sample and the enrollment typing sample correspond to entries of identical phrases.

6. The system recited in claim 4, wherein the authentication typing sample and the enrollment typing sample correspond to entries of different phrases.

7. The system recited in claim 1, wherein in response to verifying the identity of the user, the processor is further configured to authenticate the submission event.

8. The system recited in claim 1, wherein the second type of authentication information includes a headshot of the user.

9. The system recited in claim 8, wherein the headshot is captured using a webcam.

10. The system recited in claim 1, wherein the stored enrollment information includes at least two of a typing profile of the user, a headshot of the user, a capture of identification documentation associated with the user, and personal information associated with the user.

11. The system recited in claim 10, wherein the personal information associated with the user includes at least one of a legal given name of the user, a legal family name of the user, a date of birth of the user, and an address associated with the user.

12. The system recited in claim 1, wherein the submission event is associated with submission of a coursework item in an online course.

13. A method, comprising:

in response to receiving a notification of a submission event, prompting a user to provide a first type of authentication information, wherein the first type of authentication information is a typing sample provided by the user entering an authentication phrase using a keyboard, and wherein the submission event is the submission of the user's coursework comprising a quiz in an online course;

comparing authentication information received via the interface to stored enrollment information associated with the user with which the received authentication information is associated, wherein the stored enrollment information includes the first type of authentication information and a second type of authentication information collected during an enrollment phase, and in the event that a match is determined based on the comparison, verifying the identity of the user; and in the event that a match is not determined based on the comparison, prompting the user to provide the second type of authentication information, wherein a processor is configured to determine whether to issue the user a verified credential based on the comparing and on completion of the user's coursework.

14. The method of claim 13, wherein the verified credential includes a verified certificate.

15. The method of claim 13, wherein the user is prompted to provide the typing sample by entering an authentication phrase.

16. The method of claim 15, wherein the comparing includes determining whether the authentication typing sample matches an enrollment typing sample captured during the enrollment phase based at least in part on similarity criteria.

17. The method of claim 13, wherein the second type of authentication information is a headshot of the user.

18. A system, comprising:

a processor configured to:

receive first type of authentication information associated with a corresponding submission event from a user, wherein the submission event is the submission of the user's coursework comprising a quiz in an online course;

attempt to verify the identity of the user associated with the submission event by determining a match between the first type of authentication information and stored enrollment information, collected during an enrollment phase; and in the event that the identity of the user is not verified for the submission event, prompt the user to provide the second type of authentication information; and a memory coupled to the processor and configured to provide the processor with instructions, wherein the processor is configured to determine whether to issue the user a verified certificate based on both verifying the identity of the user and on completion of the user's coursework.

19. The system of claim 18, wherein the first type of authentication information includes a typing sample, and wherein the second type of authentication information includes a headshot of the user.

20. The system of claim 18, wherein determining the match includes determining, based at least in part on matching criteria, a match between an authentication typing sample and an enrollment typing sample.

21. The system of claim 18, wherein the stored enrollment information includes at least two of a typing profile of a user, a headshot of the user, a capture of identification documentation associated with the user, and personal information associated with the user.

22. The system of claim 21, wherein the typing profile included in the stored enrollment information comprises a profile of the user's typing behavior created based at least in part on a provided typing sample.

23. The system of claim 18, wherein the user's identity was verified during the enrollment phase based at least in part on a portion of the stored enrollment information.

24. The system of claim 18, wherein the submission event is associated with submission of an item in an online course.

\* \* \* \* \*